(12) United States Patent
Mujkic et al.

(10) Patent No.: US 8,171,419 B2
(45) Date of Patent: May 1, 2012

(54) METHOD AND SYSTEM FOR REMOTE MEDIA MANAGEMENT ON A TOUCH SCREEN DEVICE

(75) Inventors: Alen Mujkic, Mississauga (CA);
Michael Langlois, Almonte (CA);
Edward Eric Thomas, Ottawa (CA);
Arun Kumar, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 687 days.

(21) Appl. No.: 12/262,334

(22) Filed: Oct. 31, 2008

(65) Prior Publication Data

US 2010/0115408 A1 May 6, 2010

(51) Int. Cl.
*G06F 15/00* (2006.01)
*G06F 13/00* (2006.01)
(52) U.S. Cl. ........................ 715/764; 715/716
(58) Field of Classification Search .................. 715/716, 715/763, 765, 719–723, 864, 749, 853–854, 715/740, 750; 455/455–456
See application file for complete search history.

(56) References Cited

U.S. PATENT DOCUMENTS

| 2002/0188667 | A1 | 12/2002 | Kirnos |
| 2006/0008256 | A1* | 1/2006 | Khedouri et al. ............. 386/124 |
| 2009/0216805 | A1* | 8/2009 | Coffman et al. ........... 707/104.1 |
| 2010/0082567 | A1* | 4/2010 | Rosenblatt et al. ........... 707/705 |

OTHER PUBLICATIONS

European Patent Application No. 08168103.3, European Search Report dated Feb. 12, 2009.
European Patent Application No. 08168103.3—Office Action dated Jun. 1, 2010.

* cited by examiner

*Primary Examiner* — Cao "Kevin" Nguyen
(74) *Attorney, Agent, or Firm* — Leslie Anne Kinsman; Borden Ladner Gervais LLP

(57) ABSTRACT

The method of managing media files remotely on a portable electronic device having the touch screen display includes storing a composite media file index that lists all media files, and their attributes, whether stored on the portable electronic device or accessible at a remote computing device. The method continues by rendering a graphical user interface for a media manager application, operable to access the stored media file index, on the touch screen display. At least one activation touch event is then detected on the touch screen display, and in response to the at least one activation touch event, a group of media files having shared attributes are displayed within the graphical user interface, and at least one media file is identified for download from the remote computing device. The at least one media file is then downloaded during synchronization of the portable electronic device to the remote computing device.

20 Claims, 22 Drawing Sheets

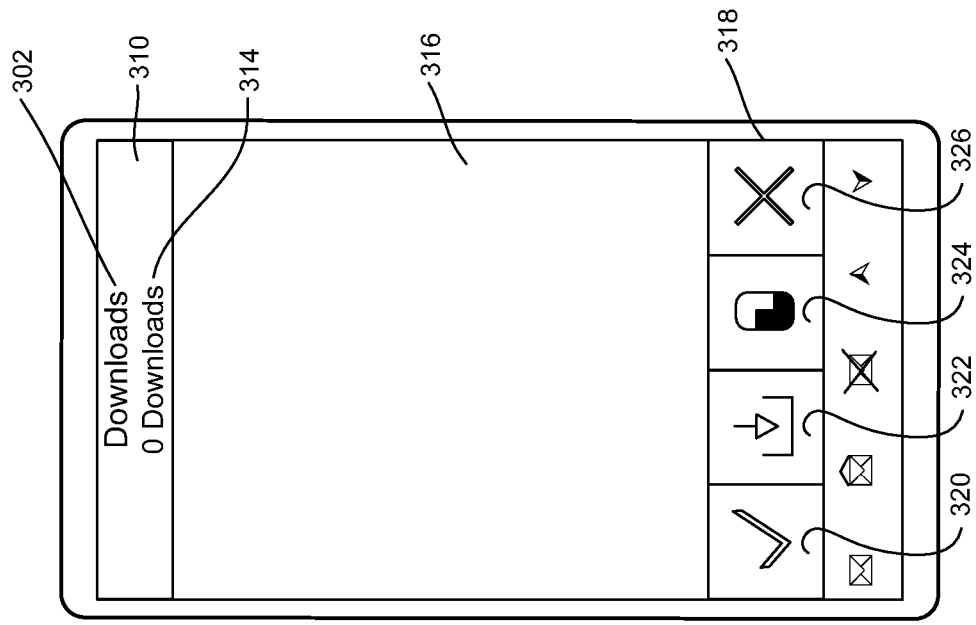
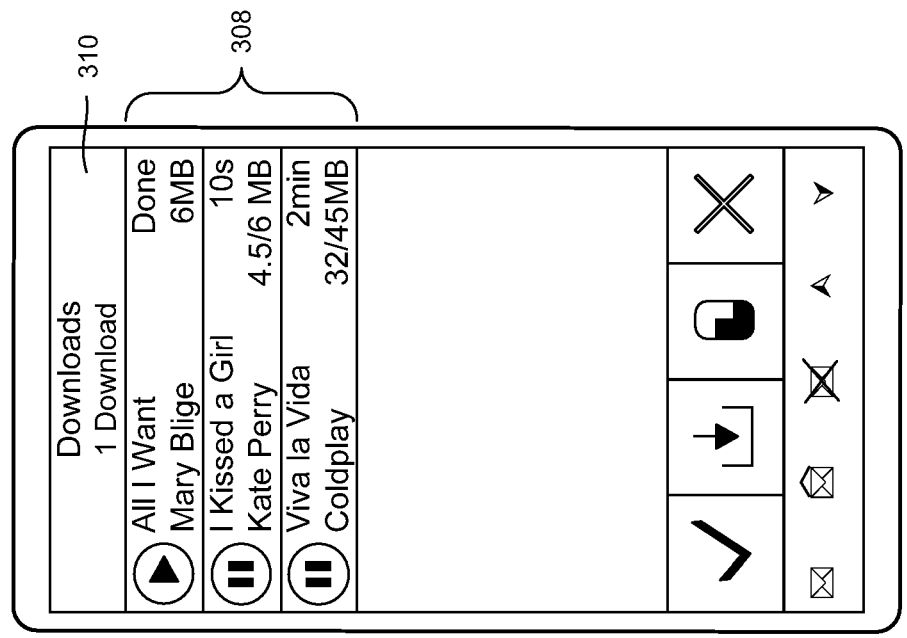
Figure 5c
Figure 6

METHOD AND SYSTEM FOR REMOTE MEDIA MANAGEMENT ON A TOUCH SCREEN DEVICE

FIELD OF TECHNOLOGY

The present disclosure relates to a portable electronic device including a touch screen display and methods of managing media using a touch screen on such a device.

BACKGROUND

Electronic devices, including portable electronic devices, are in widespread use and can provide a variety of functions including, for example, telephonic, electronic messaging and other personal information manager (PIM) application functions. Portable electronic devices can include several types of devices including mobile stations such as simple cellular telephones, smart telephones, wireless Personal Digital Assistants (PDAs), and laptop computers with wireless 802.11 or Bluetooth capabilities. These devices can include wireless communication capabilities, and can run on a wide variety of networks, from data-only networks such as Mobitex and DataTAC to complex voice and data networks such as GSM/GPRS, CDMA, EDGE, UMTS and CDMA2000 networks.

Portable electronic devices, such as PDAs and smart telephones, are generally intended for handheld use and ease of portability. Smaller devices are generally desirable for portability. A touch screen display for input and output is particularly useful on such handheld devices as such handheld devices are small and are therefore limited in space available for other user input and output devices. Further, the screen content on the touch screen display devices can be modified depending on the functions and operations being performed.

Portable electronic devices are now often provided with media players, such as mp3 and digital video players. Users generally download media files to the portable electronic device from a media library stored on a home computer. However, it can be challenging to manage media files directly on a portable electronic device, such as selecting files for subsequent download. It is therefore desirable to improve media file management capabilities, particularly on portable touch screen devices.

BRIEF DESCRIPTION OF THE DRAWINGS

Embodiments of the present disclosure will now be described, by way of example only, with reference to the attached Figures, wherein:

FIGS. 5a-16c are exemplary views of the portable electronic device of FIG. 2 depicting GUIs for user interaction.

DETAILED DESCRIPTION

Figure 1:
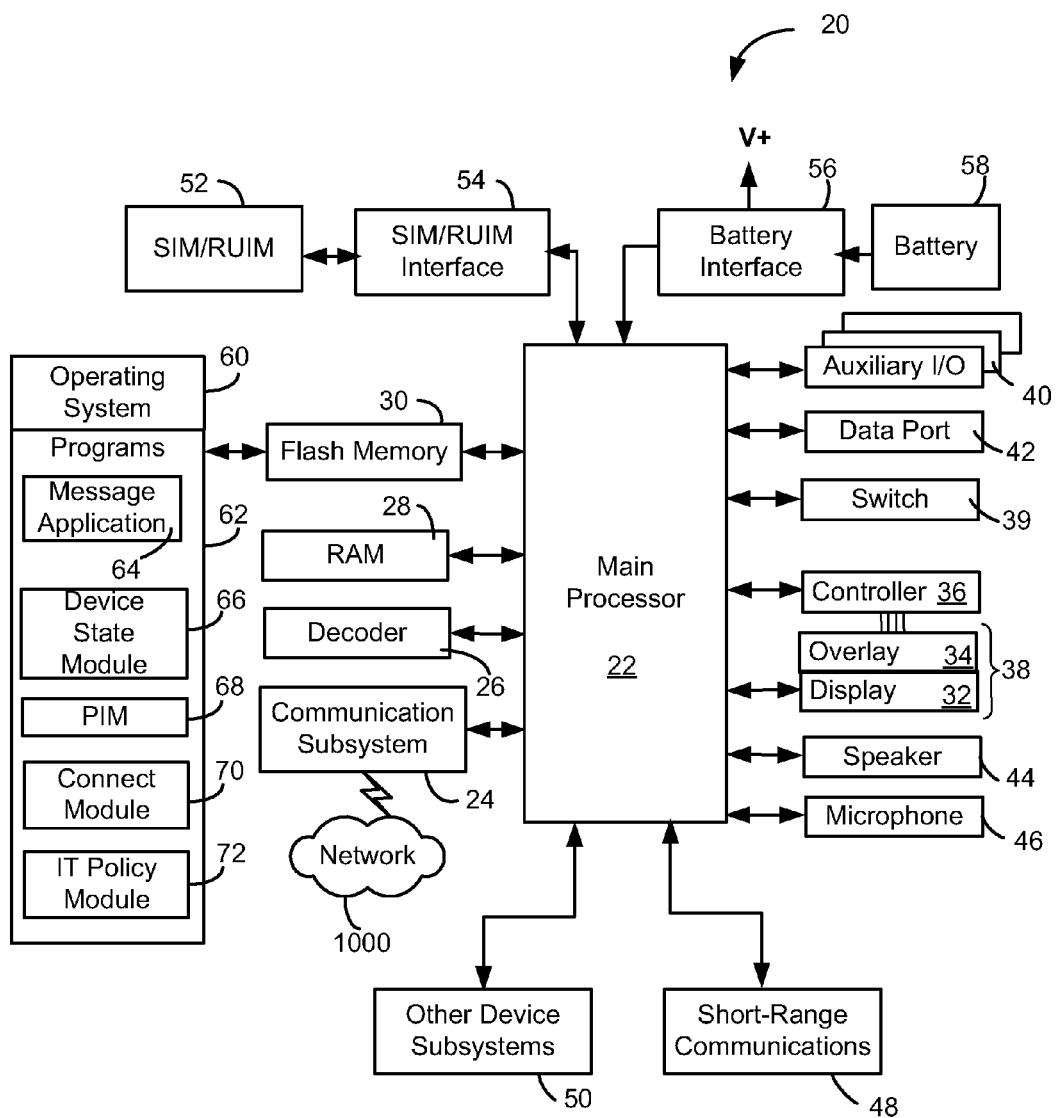
FIG. 1 is a block diagram of a portable electronic device according to one example.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a portable electronic device including a touch screen display and control of the portable electronic device to manage media files remotely. Examples of portable electronic devices include mobile, or handheld, wireless communication devices such as pagers, cellular phones, cellular smartphones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable electronic device without wireless communication capabilities as a handheld electronic game device, digital photograph album, digital camera and the like.

Referring first to FIG. 1, there is shown therein a block diagram of an exemplary embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 1000. In this exemplary embodiment of the portable electronic device 20, the communication subsystem 24 is configured in accordance with the Global System for Mobile Communication (GSM) and General Packet Radio Services (GPRS) standards. The GSM/GPRS wireless network is used worldwide. New standards such as Enhanced Data GSM Environment (EDGE) and Universal Mobile Telecommunications Service (UMTS) are believed to have similarities to the network behavior described herein, and it will also be understood by persons skilled in the art that the embodiments described herein are intended to use any other suitable standards that are developed in the future. The wireless link connecting the communication subsystem 24 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 22 also interacts with additional subsystems such as a Random Access Memory (RAM) 28, a flash memory 30, a display 32 with a touch-sensitive overlay 34 that together make up a touch screen display 38, an electronic controller 36 connected to the touch-sensitive overlay 34, a switch 39, an auxiliary input/output (I/O) subsystem 40, a data port 42, a speaker 44, a microphone 46, short-range communications 48 and other device subsystems 50. The touch-sensitive overlay 34 and the electronic controller 36 provide a touch-sensitive input device and the processor 22 interacts with the touch-sensitive overlay 34 via the electronic controller 36.

Some of the subsystems of the portable electronic device 20 perform communication-related functions, whereas other subsystems may provide "resident" or on-device functions. By way of example, the display 32 and the touch-sensitive overlay 34 may be used for both communication-related functions, such as entering a text message for transmission over the network 1000, and device-resident functions such as a calculator or task list.

The portable electronic device 20 can send and receive communication signals over the wireless network 1000 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 1000. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 1000 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30. The portable electronic device 20 can also be enabled to receive additional memory cards. For example, memory card slots (not shown) can be provided in the portable electronic device 20 to receive such cards.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 which are described in more detail below. The operating system 60 and the software components 62 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62, such as specific software applications 64, 66, 68, 70 and 72, or parts thereof, may be temporarily loaded into a volatile store such as the RAM 28. Other software components can also be included, as is well known to those skilled in the art.

The subset of software components 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software components 62 can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. The PIM 68 has the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The software components 62 also include a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 1000, the auxiliary I/O subsystem 40, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 1000. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

Synchronization of files and data between the portable electronic device 20 and another computing device can be achieved over the wireless network 1000, through the short-range communications system 48, or through a direct connection between the data port 42 of the portable electronic device 20 and the other computing device. Synchronization causes the most recent version of files and data to be mirrored on either the portable electronic device or the other computing device. As used herein, synchronization also refers to the downloading or uploading of pre-selected files from one device to the other. Synchronization of files and data can be initiated by the user of the device whenever a suitable connection between the portable electronic device 20 and another computing device, such as a home computer, is detected, or can occur automatically when a connection is detected. A synchronization application, stored in the portable electronic device 20 and/or the other computing device, can determine the file and data types to be synchronized, the frequency of synchronization, and other parameters, appropriate to the particular synchronization algorithm implemented by the synchronization application.

In use, a received signal such as a text message, an e-mail message, or web page download is processed by the communication subsystem 24 and input to the processor 22. The processor 22 then processes the received signal for output to the display 32 or alternatively to the auxiliary I/O subsystem 40. A subscriber may also compose data items, such as e-mail messages, for example, using the touch-sensitive overlay 34 on the display 32 that are part of the touch screen display 38, and possibly the auxiliary I/O subsystem 40. The auxiliary I/O subsystem 40 may include devices such as: a mouse, track ball, infrared fingerprint detector, or a roller wheel with dynamic button pressing capability. A composed item may be transmitted over the wireless network 1000 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display 32 can also be used to provide additional information such as the identity of a calling party, duration of a voice call, or other voice call related information.

Figure 2:
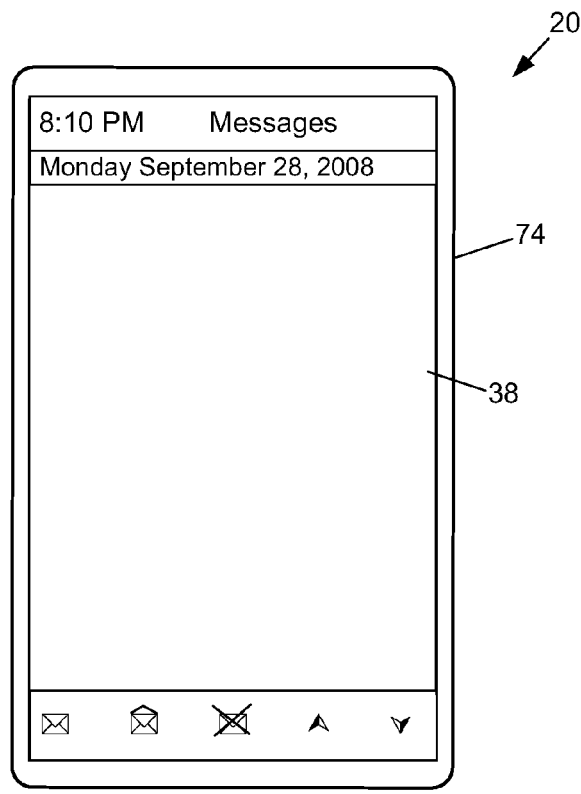
FIG. 2 is a front view of an exemplary portable electronic shown in a portrait orientation.

Reference is now made to FIG. 2, which shows a front view of an exemplary portable electronic device 20 in portrait orientation. The portable electronic device 20 includes a housing 74 that houses the internal components that are shown in FIG. 1 and frames the touch screen display 38 such that the touch screen display 38 is exposed for user-interaction therewith when the portable electronic device 20 is in use.

Figure 3:
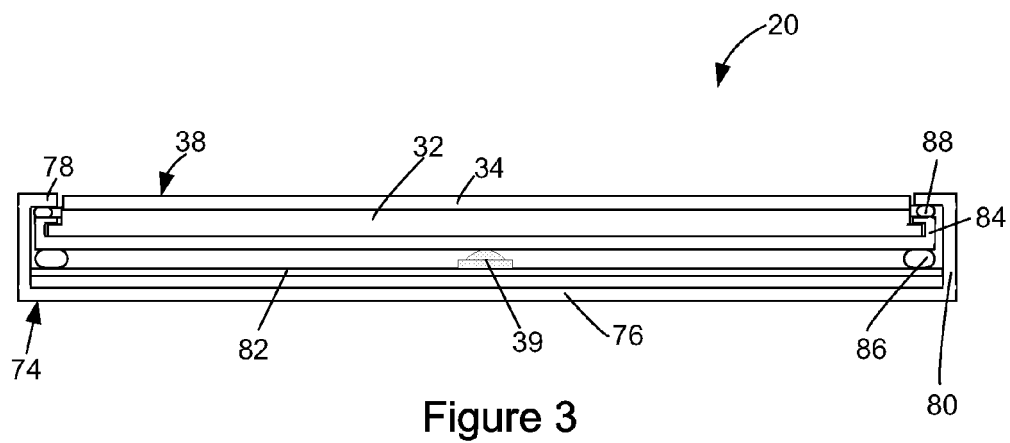
FIG. 3 is a simplified sectional side view of the portable electronic device of FIG. 2 (not to scale), with a switch shown in a rest position.

As best shown in FIG. 3, the housing 74 includes a back 76, a frame 78, which frames the touch-sensitive display 38, sidewalls 80 that extend between and generally perpendicular to the back 76 and the frame 78, and a base 82 that is spaced from and generally parallel to the back 76. The base 82 can be any suitable base and can include, for example, a printed circuit board or flex circuit board. The back 76 includes a plate (not shown) that is releasably attached for insertion and removal of, for example, the battery 58 and the SIM/RUIM card 52 described above. It will be appreciated that the back 76, the sidewalls 80 and the frame 78 can be injection molded, for example. In the exemplary portable electronic device 20 shown in FIG. 2, the frame 78 is generally rectangular with rounded corners although other shapes are possible.

The display device 32 and the overlay 34 can be supported on a support tray 84 of suitable material such as magnesium for providing mechanical support to the display device 32 and overlay 34. The display device 32 and overlay 34 are biased away from the base 82, toward the frame 78 by biasing elements 86 such as gel pads between the support tray 84 and the base 82. Compliant spacers 88, which can also be in the form of gel pads for example, are located between an upper portion of the support tray 84 and the frame 78. The touch screen display 38 is moveable within the housing 74 as the touch screen display 38 can be moved toward the base 82, thereby compressing the biasing elements 86. The touch screen display 38 can also be pivoted within the housing 74 with one side of the touch screen display 38 moving toward the base 82, thereby compressing the biasing elements 86 on the same side of the touch screen display 38 that moves toward the base 82.

In the present example, the switch 39 is supported on one side of the base 82 which can be printed circuit board while the opposing side provides mechanical support and electrical connection for other components (not shown) of the portable electronic device 20. The switch 39 can be located between the base 82 and the support tray 84. The switch 39, which can be a mechanical dome-type switch, for example, can be located in any suitable position such that displacement of the touch screen display 38 resulting from a user pressing the touch screen display 38 with sufficient force to overcome the bias and to overcome the actuation force for the switch 39, depresses and actuates the switch 39. In the present embodiment the switch 39 is in contact with the support tray 84. Thus, depression of the touch screen display 38 by user application of a force thereto, causes actuation of the switch 39, thereby providing the user with a positive tactile quality during user interaction with the user interface of the portable electronic device 20. The switch 39 is not actuated in the rest position shown in FIG. 3, absent applied force by the user. It will be appreciated that the switch 39 can be actuated by pressing anywhere on the touch screen display 38 to cause movement of the touch screen display 38 in the form of movement parallel with the base 82 or pivoting of one side of the touch screen display 38 toward the base 82. The switch 39 is connected to the processor 22 and can be used for further input to the processor when actuated. Although a single switch is shown any suitable number of switches can be used and can be located in any suitable position.

The touch screen display 38 can be any suitable touch screen display such as a capacitive touch screen display. A capacitive touch screen display 38 includes the display 32 and the touch-sensitive overlay 34, in the form of a capacitive touch-sensitive overlay 34. It will be appreciated that the capacitive touch-sensitive overlay 34 includes a number of layers in a stack and is fixed to the display 32 via a suitable optically clear adhesive. The layers can include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the present example, the X and Y location of a touch are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user or a conductive object held in a bare hand of a user resulting in a change in the electric field of each of the touch sensor layers. The signals represent the respective X and Y touch location values. It will be appreciated that other attributes of the user's touch on the touch screen display 38 can be determined. For example, the size and the shape of the touch on the touch screen display 38 can be determined in addition to the location (X and Y values) based on the signals received at the controller 36 from the touch sensor layers.

As will be appreciated, the controller 36 interprets touch events detected on the touch screen display 38, and controls the portable electronic device 20 accordingly. As used herein, a touch event can be, for example, a single touch, a combination of touches, such as a "double touch", a "touch and hold", a "touch and drag", or a touch made with sufficient force to depress the switch 39 described above. The interpretation of a given touch event will depend on the software and implementation details used by the portable electronic device 20. According to an embodiment, an activation touch event, also referred to as a "click" touch event or "clicking", is a touch event where sufficient force is applied to the touch screen 38 to depress or activate the switch 39, and to provide tactile feedback to the user. Such an activation touch event invokes an action as determined by the underlying application and as displayed to the user in a graphical user interface (GUI). As used herein, a user selection is made by such an activation touch event. According to an embodiment, a highlighting touch event, also referred to as a "focus" touch event, is a touch event where the touch screen display 38 is touched lightly without sufficient force to activate the switch 38, and causes the item so touched to be highlighted, or otherwise visibly selected, for further action.

In general, the method of managing media files remotely on the portable electronic device 20, having the touch screen display 38, includes storing a composite media file index in the memory 30. The composite media file index lists all media files, and their attributes, whether stored on the portable electronic device 20 or accessible at a remote computing device. The method continues by rendering a graphical user interface for a media manager application, operable to access the stored media file index, on the touch screen display 38. At least one activation touch event is then detected on the touch screen display 38, and in response to the at least one activation touch event, a group of media files having shared attributes are displayed within the graphical user interface, and at least one media file is identified for download from the remote computing device. The at least one media file is then downloaded during synchronization of the portable electronic device 20 to the remote computing device.

Figure 4:
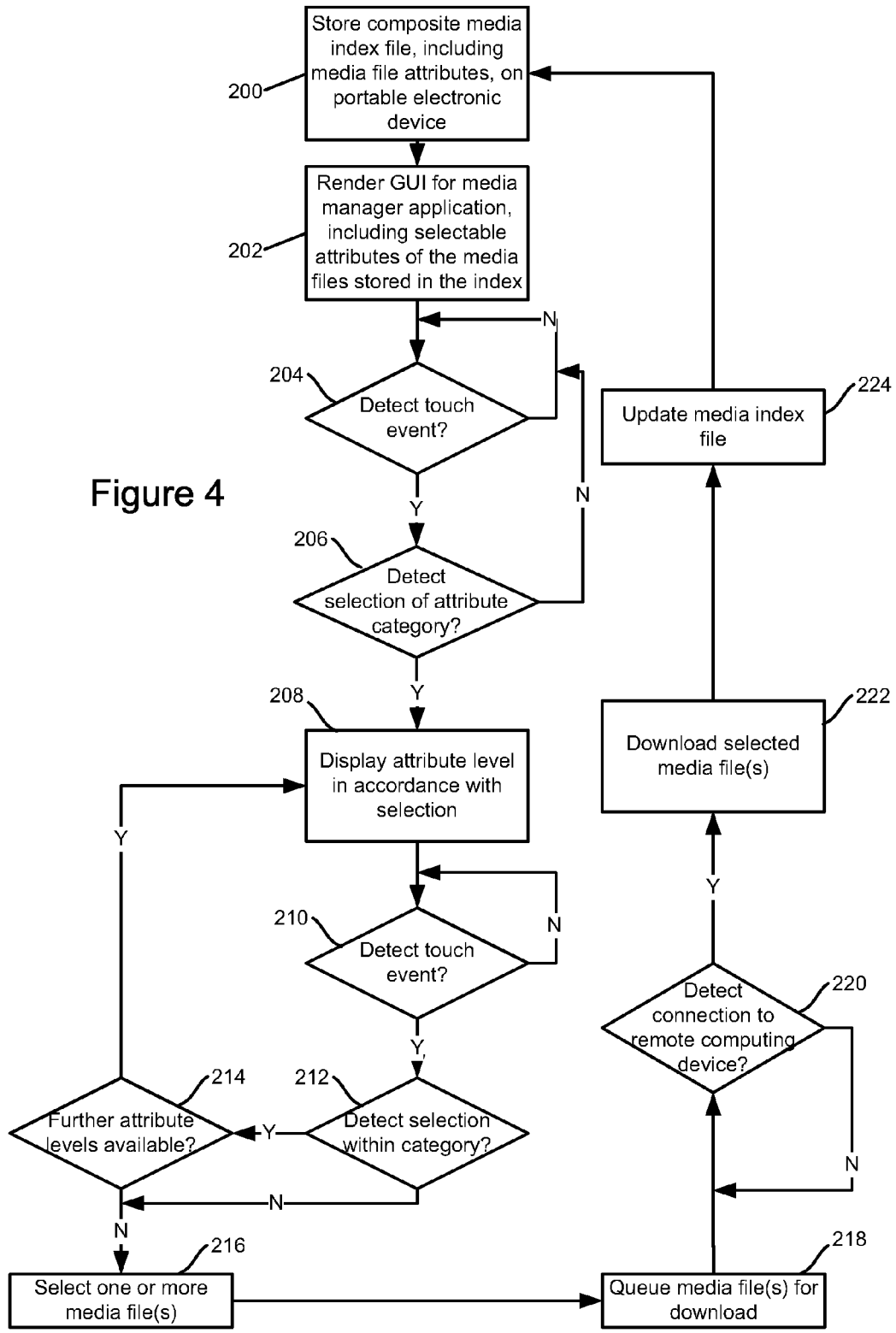
FIG. 4 is a flow chart showing a method for remote media management according to an embodiment.
Figures 5A, 5B:
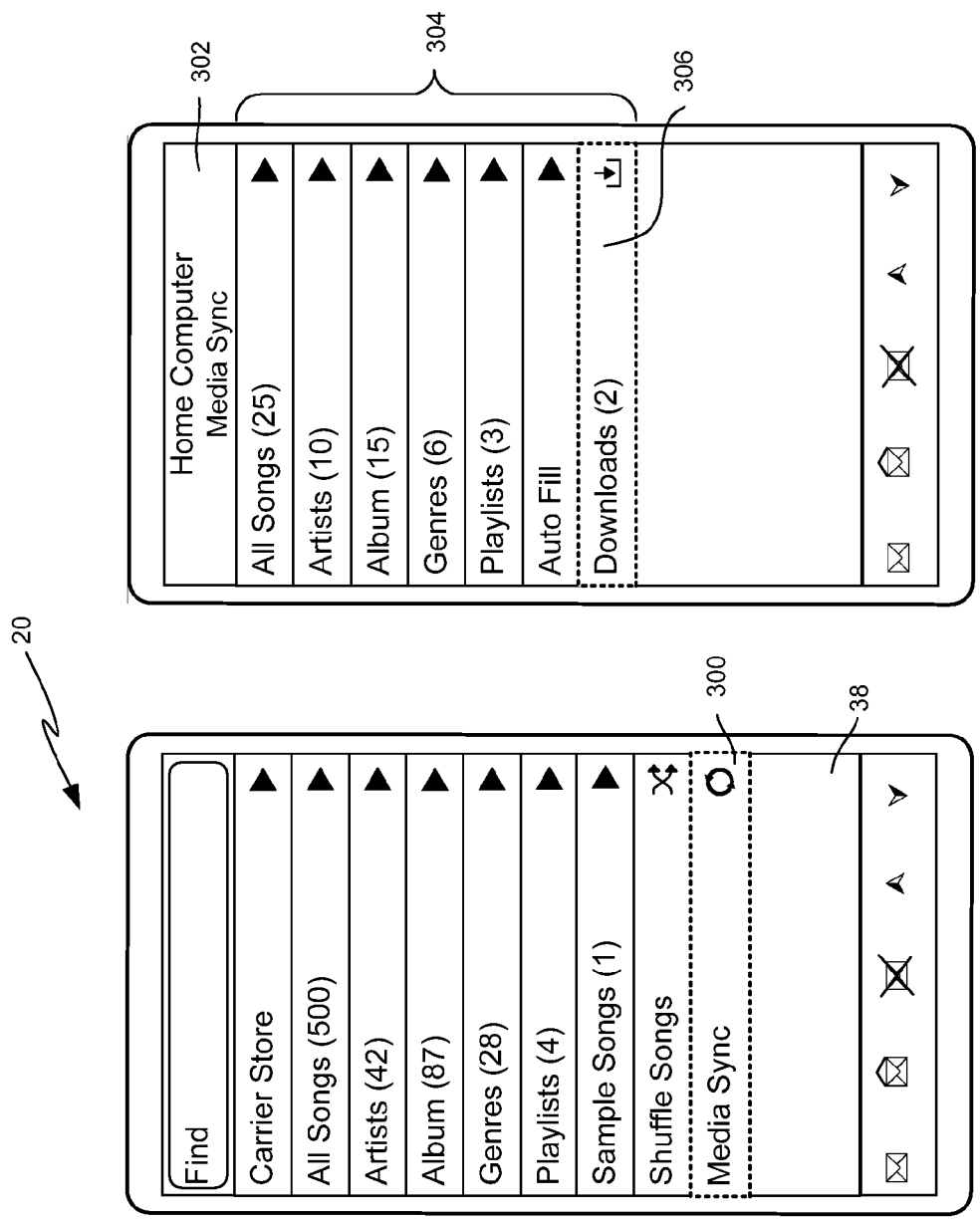

Reference is now made to FIG. 4 to describe a method of remote media management on a portable electronic device in accordance with one embodiment. It will be appreciated that the steps of FIG. 4 can be carried out by routines or subroutines of software executed by the processor 22. Coding of software for carrying out such steps is well within the scope of a person of ordinary skill in the art having regard to the present description. The process shown and described with reference to FIG. 4 is simplified for the purpose of the present explanation and other steps and substeps may be included. Alternatively, some of the steps and substeps may be excluded.

A composite media index file, including media file attributes such as artist album, genre, playlist membership and download status, is stored on the portable electronic device (step 200). The composite media index file includes all media files that are resident on either the portable electronic device 20 or a remote computing device, such as a home computer. The media files accessible at the remote computing device can be those stored in a generic media library, or managed through a third-party application, such as ITunes® or Windows Media Player™. A graphical user interface (GUI) for a media manager application is rendered on the touch screen display 32 (step 202). The GUI includes selectable features that correspond to the attributes of the media files stored in the media file index. The GUI can also include selectable features that correspond to the actions or functions to be implemented by the media manager application.

If a touch event is detected (step 204), and it is determined that an attribute category, or type, has been selected (step 206), the method proceeds to step 208. Such a touch event can be determined upon a user touch or tap on the touch screen display 38 at any one of the selectable attributes. The selection of a particular attribute is made and detected when sufficient force is applied to the touch screen 38 actuating the switch 39. If no touch event is detected, or if no selection of an attribute category is detected, the processor 22 continues to monitor for a touch event. At step 208, the members of the selected attribute category, also termed herein as the attribute level, are displayed in a further screen of the GUI, and the processor 22 continues to monitor for a further touch event on the touch screen display 38. The contents of the attribute level can be a listing of individual media files, or a refined list within the selected category, the members of which can be further selected for further drill down within the attribute category. The further drill down can be achieved, for example, by refining the selection with a further attribute selection.

If a further touch event is detected (step 210), and if it is determined that the touch event, followed by application of sufficient force to the touch screen 38 actuating the switch 39, corresponds to a selection within the displayed attribute category (step 212), a determination is made as to whether further drill down is available or required to select specific media files. If further drill down is indicated, the next attribute level is displayed in a new GUI screen in accordance with the selection detected within the displayed category (step 208). Otherwise, one or more media file(s) are selected in accordance with the selection made in step 212 (step 216), and the selected media file(s) are queued for download (step 218).

When a connection to the remote computing device is next detected (220), the selected media file(s) are downloaded (step 222), and the media file index stored on the portable electronic device is updated (step 224). The downloading can occur during a synchronization operation between the portable electronic device 20 and the remote computing device. Such synchronization can occur over a wired or wireless connection, as described above.

Reference is made to FIGS. 5-16 to describe examples of the method of remotely managing media according to specific embodiments. FIGS. 5a-5c show how the remote media manager application is selected on the portable electronic device 20. As shown in FIG. 5a, a GUI for a media application is displayed on the touch screen display 38. In response to a user clicking the screen 38 in the vicinity of the selectable "Media Sync" feature 300, a screen is rendered for the remote media manager application, as shown in FIG. 5b. The banner 302 identifies the remote computing device with which the portable electronic device 20 is currently synchronizing, or is scheduled to synchronize. A number of selectable attribute categories can be shown in this initial screen. As shown, the attribute categories 304 are "All Songs", "Artists", "Album", "Genre", "Playlists", and "Downloads". Detecting a user click on one of the selectable attribute categories, such as the "Downloads" feature 306 results in the display of a list of media files 308 that are pending download or recently downloaded. The banner 310 indicates that the "Downloads" screen is being viewed.

Referring to FIG. 6, the "Downloads" screen is once again shown. The banner 310 identifies the current attribute level 312 ("Downloads"), and the number of downloads 314 that have been downloaded onto the device since the list was last cleared. In the illustrated example, "0 Downloads" are pending or completed, thus the list area 316 is blank. A shortcut bar 318 is displayed below the list area 316. The shortcut bar 318 displays available shortcuts, or functions, that can be invoked by detecting a user touching the displayed icons. The illustrated icons are shortcuts to a "Clear List" function 320, a "Download All" function 322, a "Memory" function 324 and a "Delete" function 326. As will be further described below, the "Clear List" function 320 removes any items from the list area 316 that have been downloaded; the "Download All" function 322 activates all pending and stopped downloads; the "Memory" function 324 takes the user to a memory application; and the "Delete" function 326 removes selected media files from the download list 316 and from the portable electronic device memory 30. The icons for the various functions are shown in either bold (see e.g. icon 324) or grayed-out formats (see e.g. icon 320) to show their current availability or lack thereof, respectively.

Figure 7:
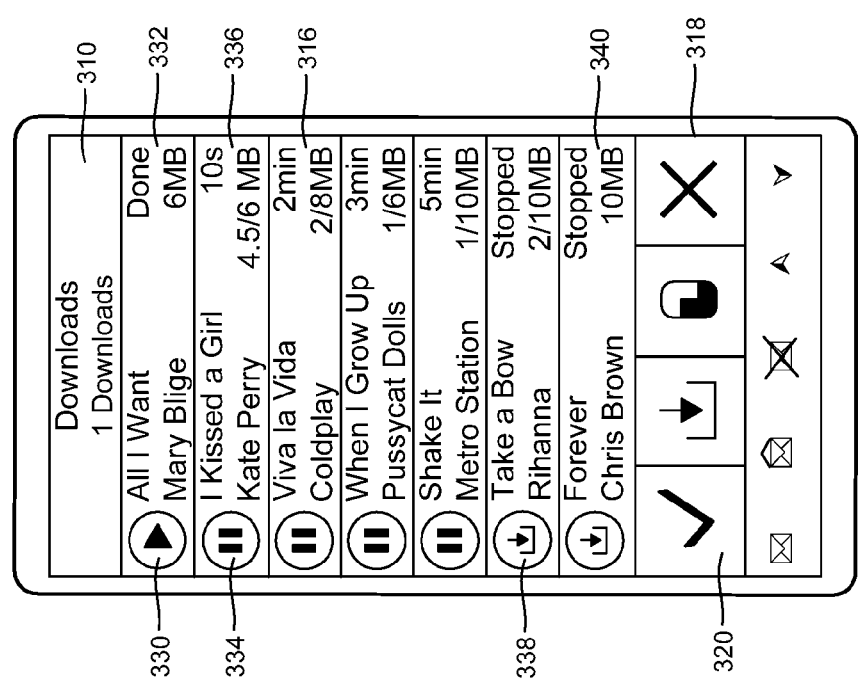

Referring to FIG. 7, a screen showing download status indicators is illustrated. The list area 316 lists items by title (e.g. "All I Want") and artist (e.g. "Mary Blige"), and includes a status indicator to the left and right of each title. In the illustrated embodiment, a "Play" indicator 330 indicates that the media file, or content, associated with this title has been downloaded. This status is further reinforced by the status indicator 332 to the right of the title that indicates the download status is "Done", and provides the total download size (e.g. 6 MB). If a user click is detected within the item, the song will be played by the media player. As noted above, detecting a selection of the "Clear List" icon 320 will clear any such downloaded items from the "Downloads" screen.

The "Currently Downloading" indicator 334 indicates that the media file is currently being downloaded, while the indicator 336 to the right of each currently downloading title indicates the estimated time remaining to complete the download, the current amount downloaded and the total amount to download. If a user clicks an item showing a "Currently Downloading" icon, the download will be paused or stopped, and the status indicator will change to a "Stopped Download" icon 338. To the right of the title of an item that has been stopped, an indicator 340 indicates "Stopped" and specifies the number of bytes downloaded, if any. If a user click is detected in an item showing a "Stopped Downloading" icon 338, the download will start or resume if the portable electronic device 20 has a connection to the remote computing device via a suitable connection, and the status indicator will change to "Currently Downloading" icon 334.

Figure 8A:
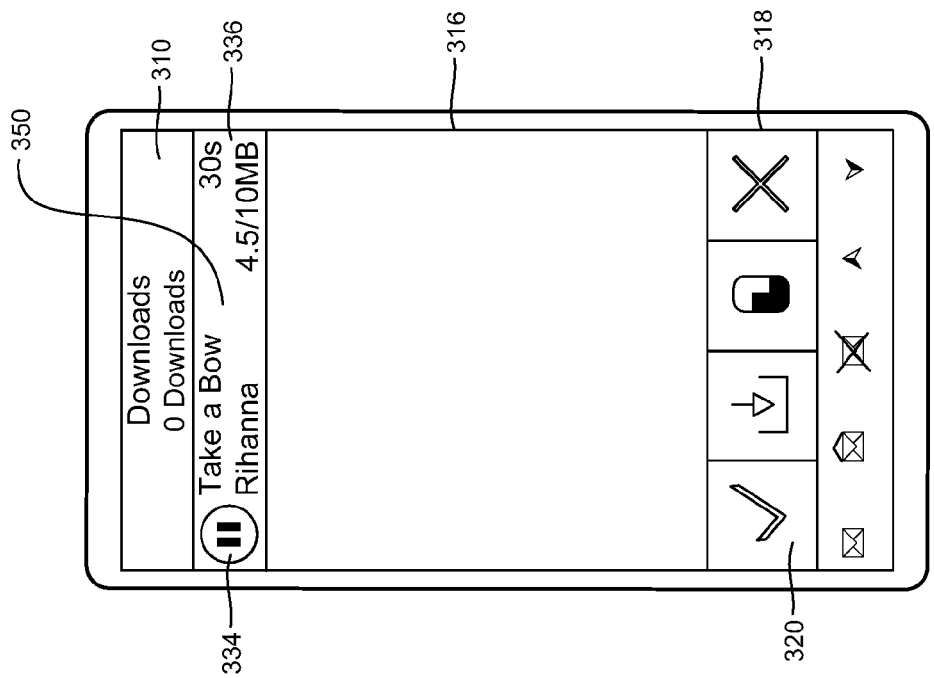
Figure 8C:
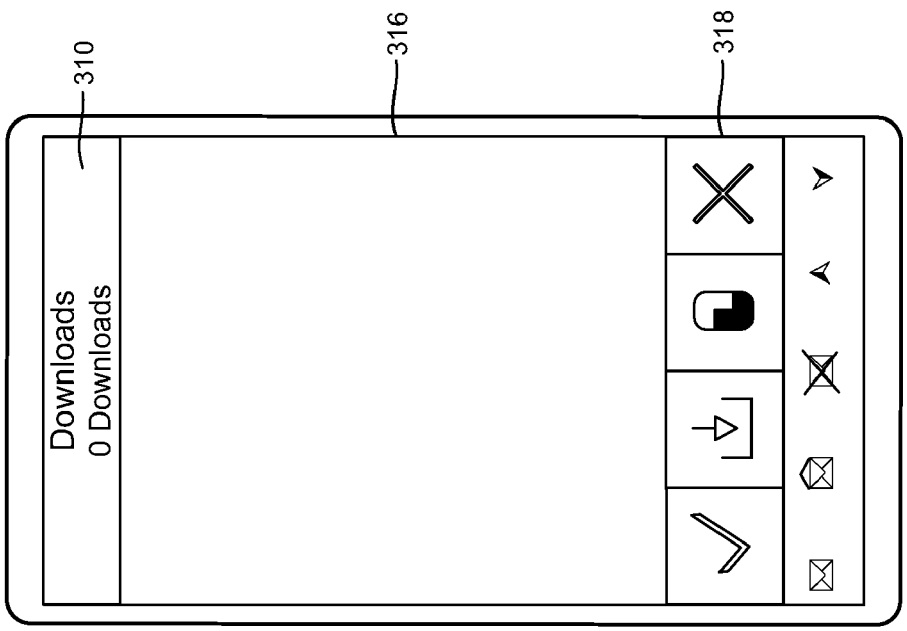
Figure 8B:
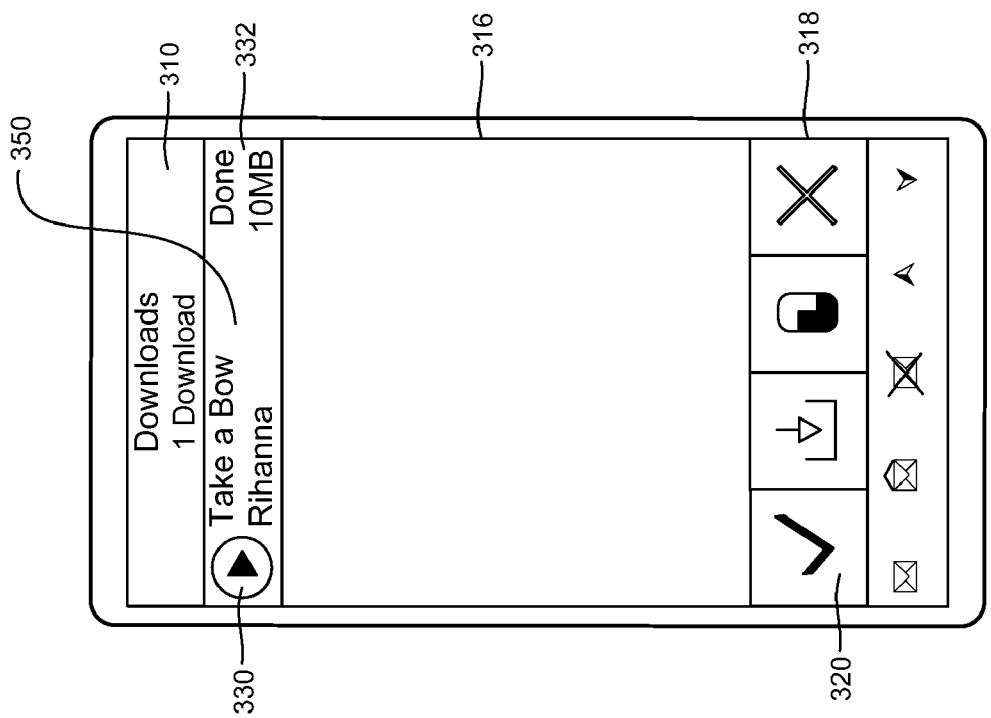

With reference to FIGS. 8a-8c, the screens and status indicators for a currently downloading file can be seen according to an embodiment. In FIG. 8a, the status indicators 334, 336 for the item 350 indicate that the file is currently downloading, that 30s of downloading time remains, and the 4.5 of 10 MB have been downloaded. In FIG. 8b, the status indicators 330 and 332 show that the download is complete, and the banner area 310 shows that "1 Download" is complete. The "Clear List" function 320 is now displayed as active, and user clicking of this icon results in clearing the item 350 from the list area 316, and displaying "0 Downloads" in the banner 310, as shown in FIG. 8c.

Figure 9B:
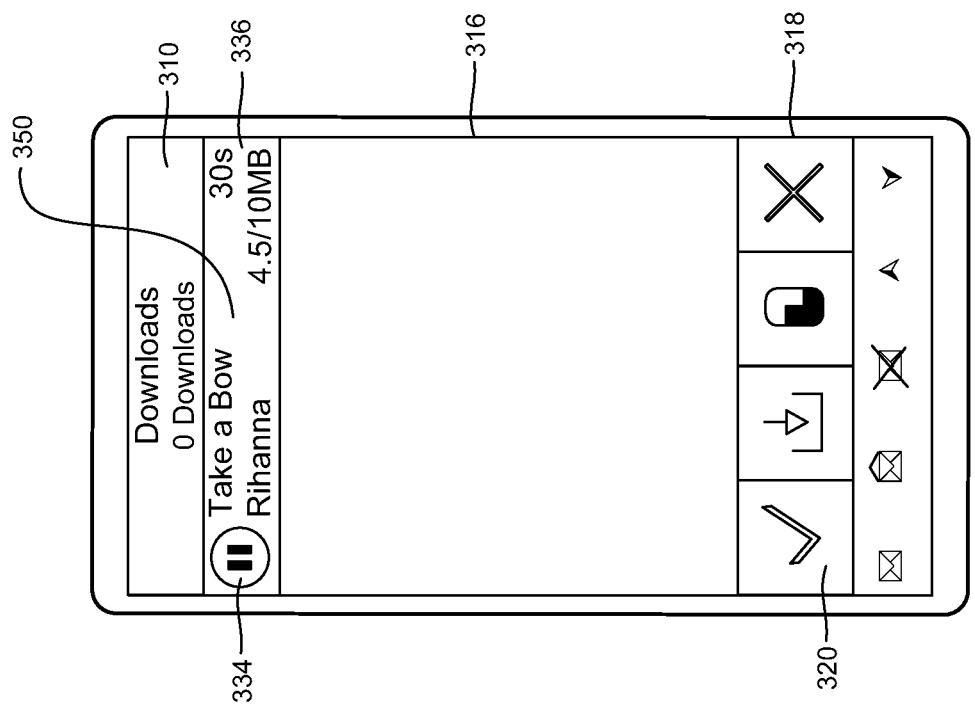
Figure 9A:
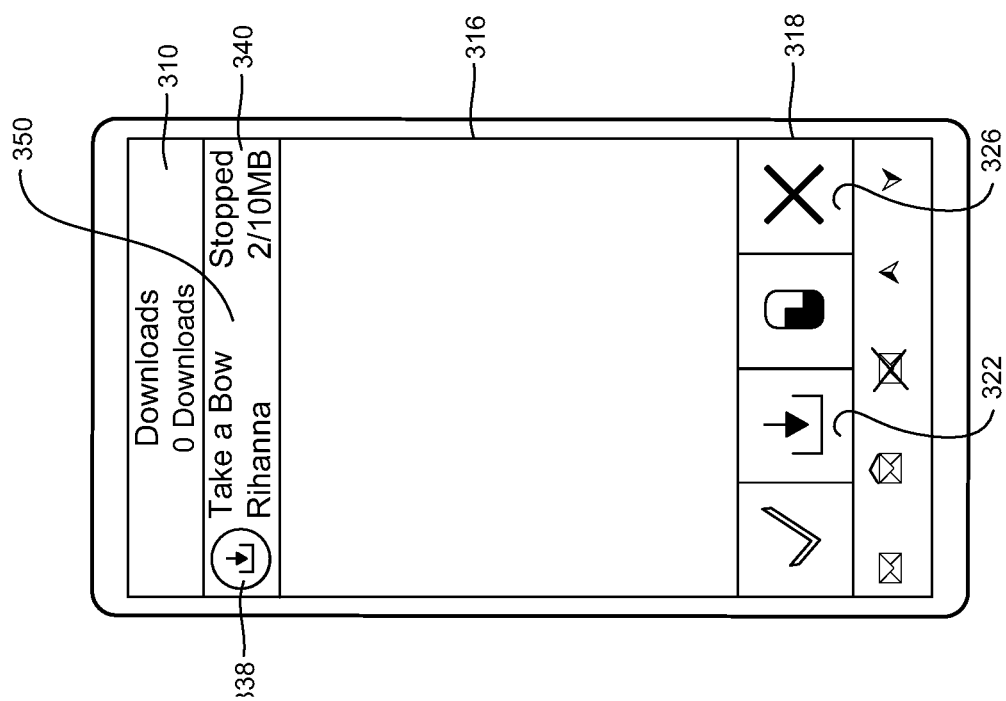
Figure 9D:
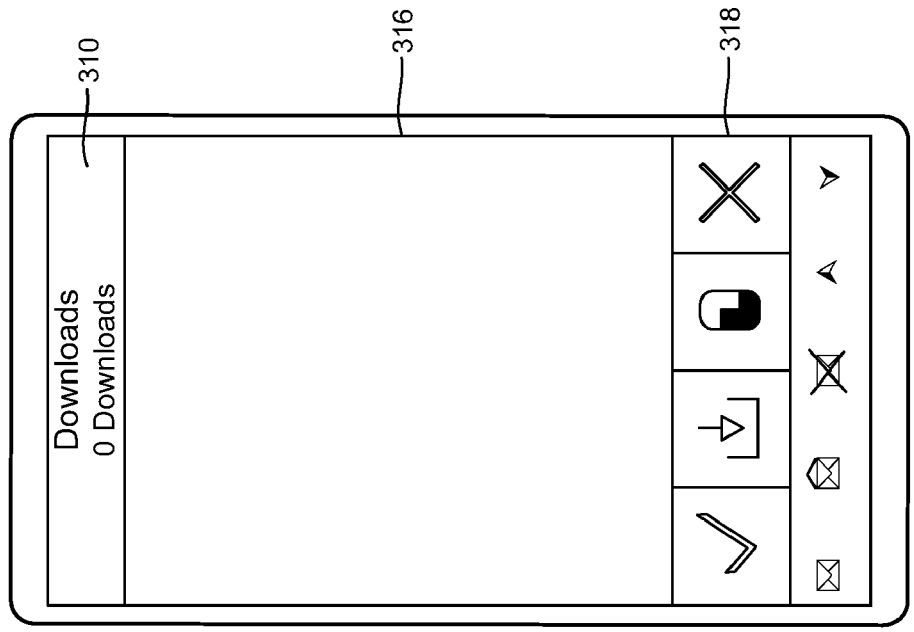
Figure 9C:
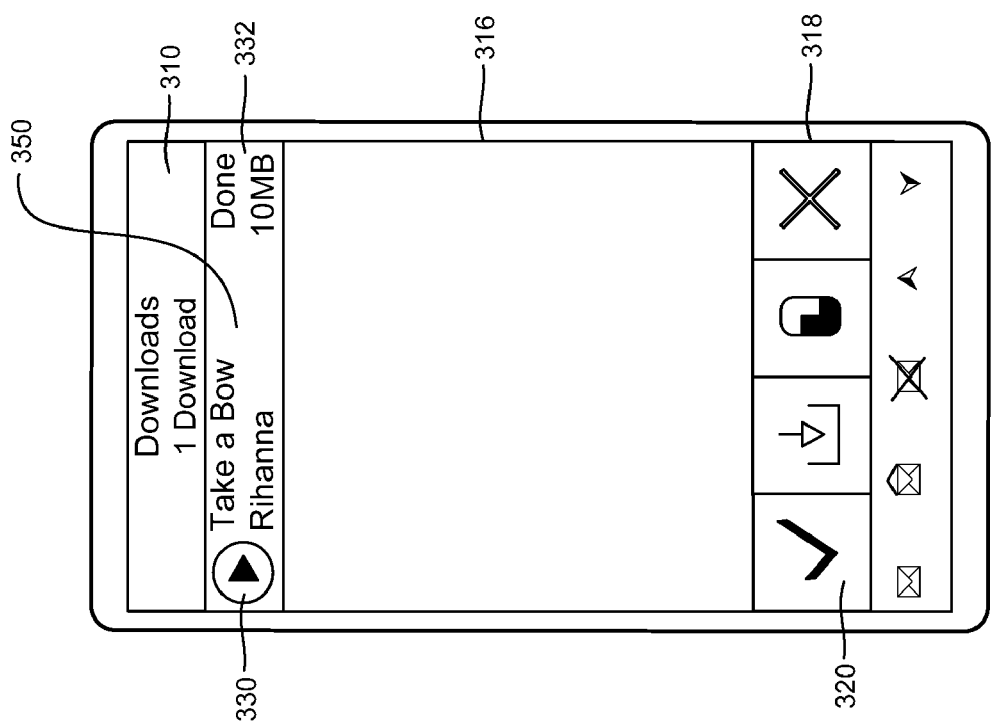

With reference to FIGS. 9a-9d, screens and status indicators seen according to an embodiment when resuming a single file download are shown. In FIG. 9a, the status indicators 338, for the item 350 show that it is a stopped download. The "Download All" function 322 is shown to be active, and its selection by a user click results in the screen of FIG. 9b. It should also be noted that the "Delete" function 326 is also shown as active. As described further below, user selection of this function results in the complete removal of the media file from the list area 316 and from the portable electronic device memory. In FIG. 9b, the status indicators 334, 336 for the item 350 indicate that the file is currently downloading, that 30s of downloading time remains, and that 4.5 of 10 MB have been downloaded. In FIG. 9c, the status indicators 330 and 332 show that the download is complete, and the banner area 310 shows that "1 Download" is complete. The "Clear List" icon 320 is now displayed as active, and user touch of this icon results in clearing the item 350 from the list area 316, and displaying "0 Downloads" in the banner 310, as shown in FIG. 9d.

Figure 10B:
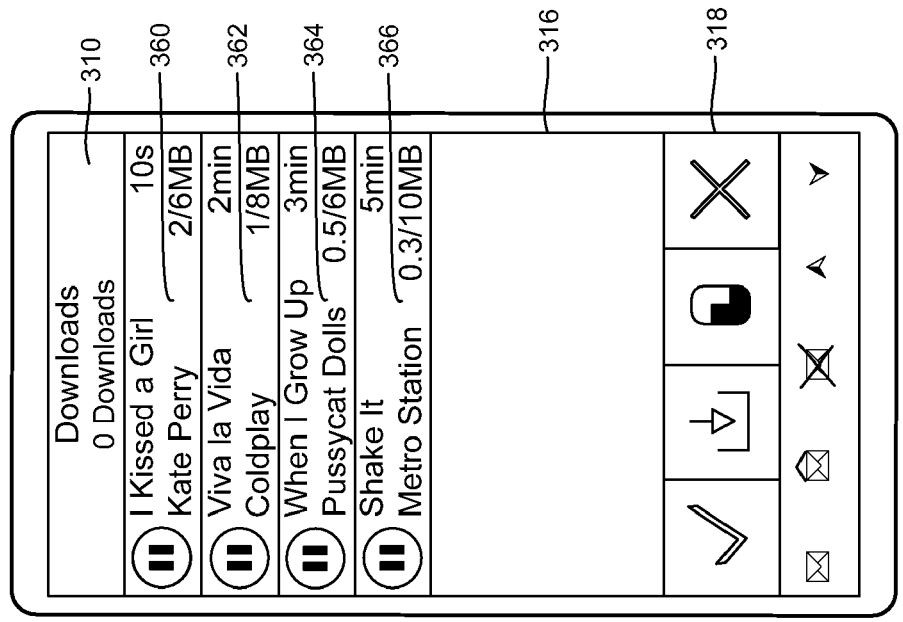
Figure 10A:
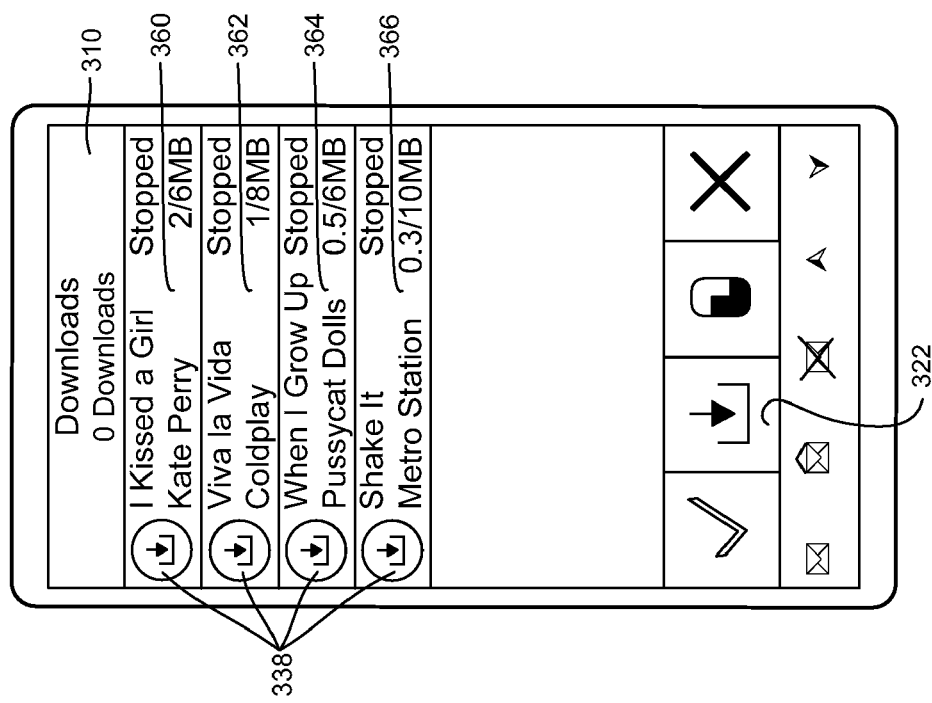
Figure 10D:
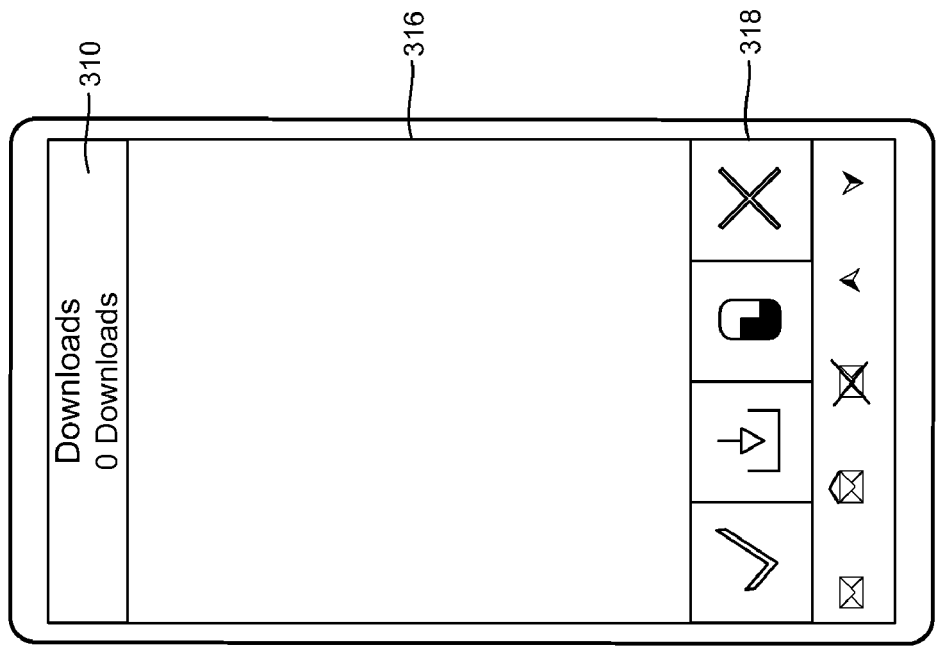
Figure 10C:
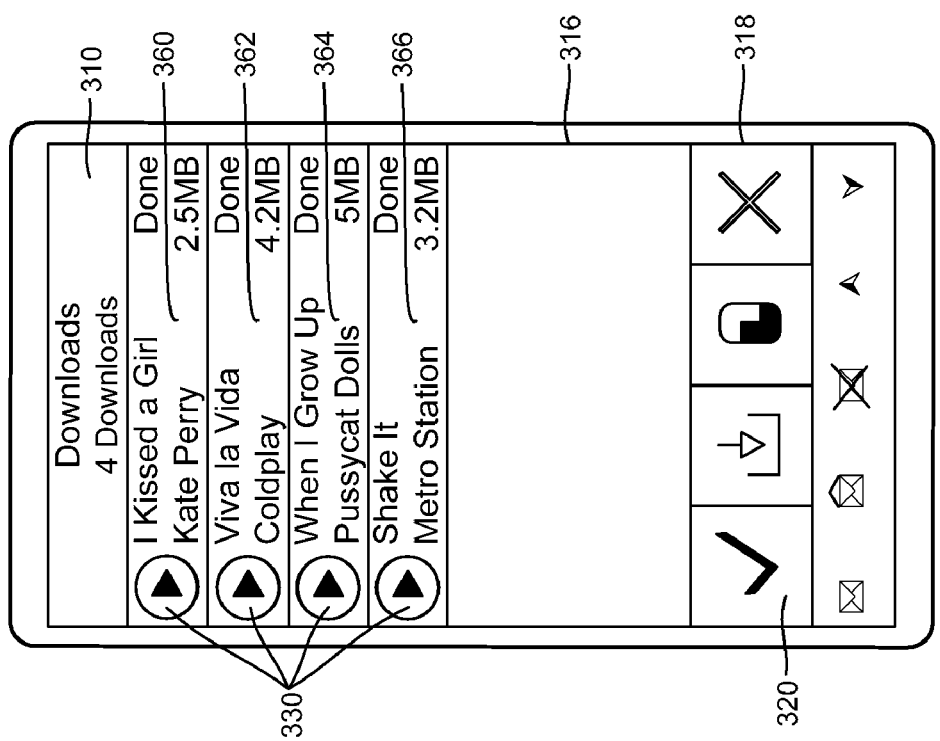

With reference to FIGS. 10a-10d, screens and status indicators seen according to an embodiment when resuming a multiple file download are shown. In FIG. 10a, the banner 310 shows that there are currently "0 Downloads", and the list area 316 shows four items 360, 362, 364, and 366 that display a "Stopped Download" status indicator 338. To resume downloading the media files associated with each item, the user could click each item separately to cause the items to resume downloading, or could select the "Download All" function 322, which will cause all items that are stopped to resume downloading, and will result in the screen shown in FIG. 10b. Each of the items 360, 362, 364, and 366 has a status indicator 334 indicating that it is currently downloading. Once downloading of all the items is complete, the banner 310 indicates that "4 Downloads" are complete, and the status indicators for each item are changed to a play indicator 330, as shown in FIG. 10c. Selection of any item by a user will result in the associated media file being played through the media player. The "Clear List" icon 320 is also displayed as active, and clicking this selectable feature results in clearing all the items from the list area 316, and displaying "0 Downloads" in the banner 310, as shown in FIG. 10d.

Figure 11B:
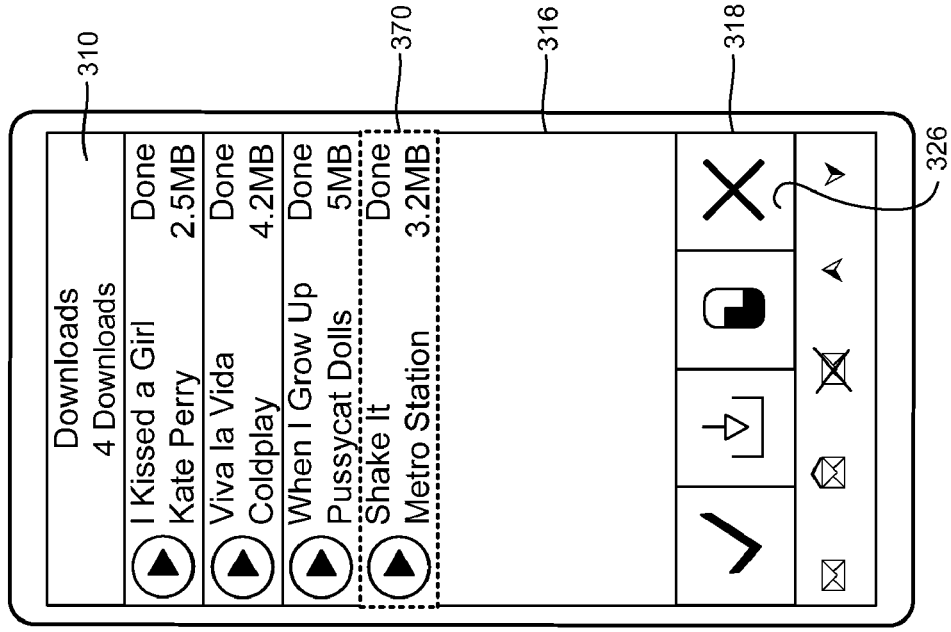
Figure 11A:
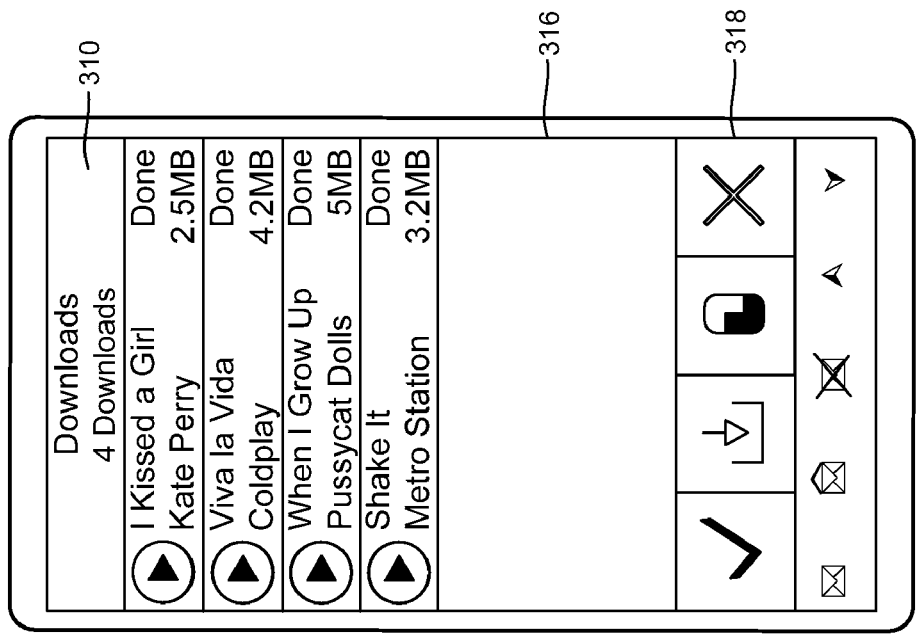
Figure 11D:
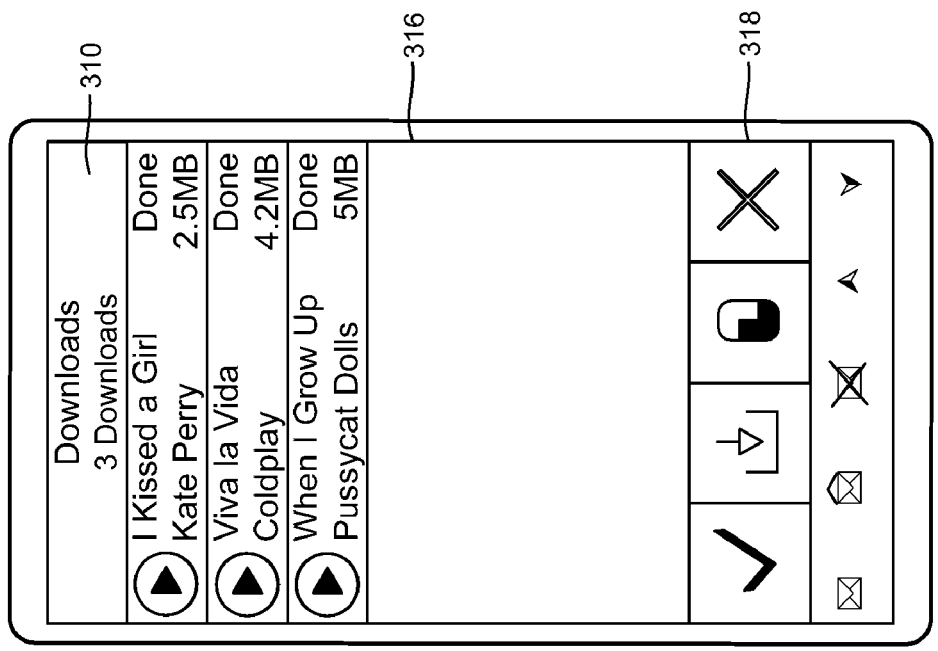
Figure 11C:
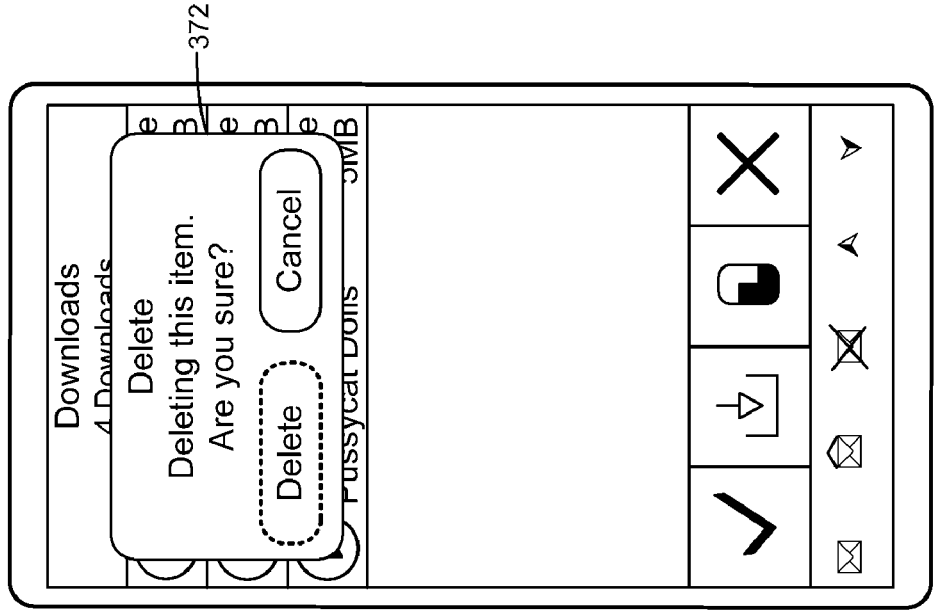

The deletion of a media file from the portable electronic device 20 is shown with reference to FIGS. 11a-11d. The screen shown in FIG. 11a displays four downloaded items within the list area 316, and as also indicated by the banner 310. If one of the items, such as item 370 is brought into focus, or highlighted, such as by a highlighting touch event, and the user selects by clicking the "Delete" function 326, as shown in FIG. 11b, a confirmation window 372 will be displayed, as shown in FIG. 11c, asking the user to confirm the deletion. If the user confirms the deletion, by clicking the "Delete" button in the confirmation window 372, the media file associated with the item 370 will be deleted from the portable electronic device memory, and the list area 316 and banner 310 updated to show only three downloaded items.

The present method provides users with easy and intuitive navigation within the media manager application. The ease with which a user can quickly select media files for download is clearly apparent with reference to FIGS. 12a-14c.

Figure 12B:
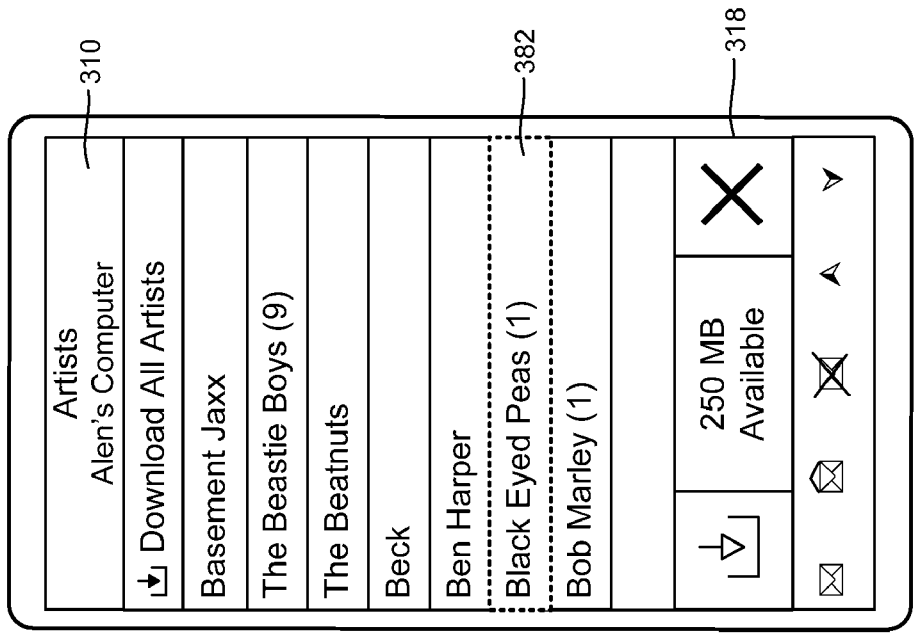
Figure 12A:
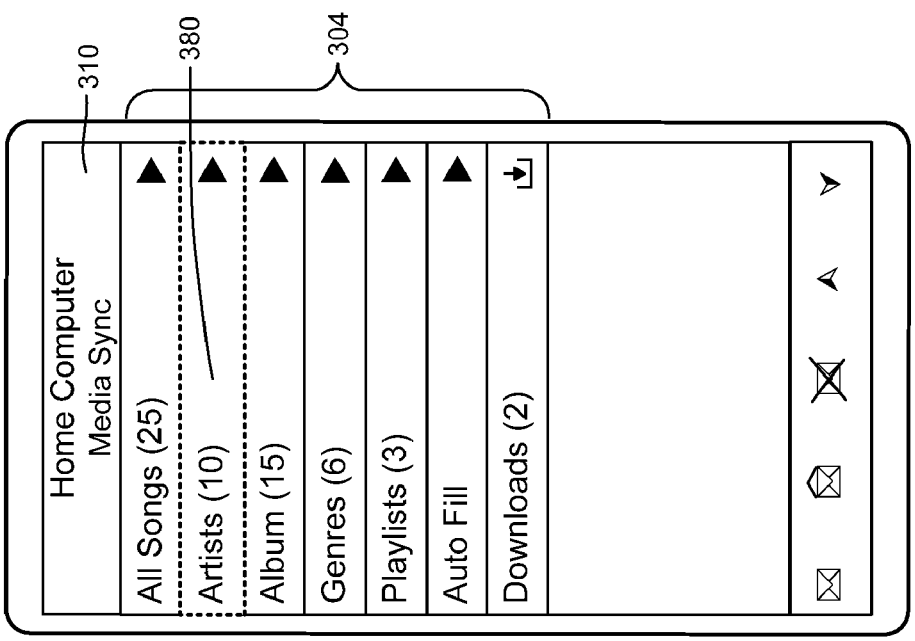
Figure 12D:
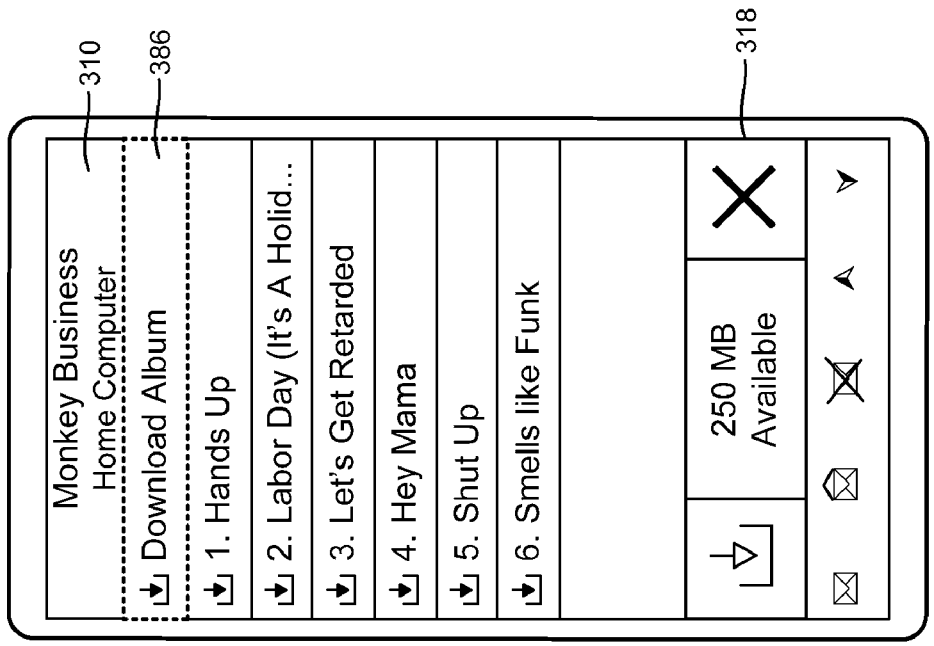
Figure 12C:
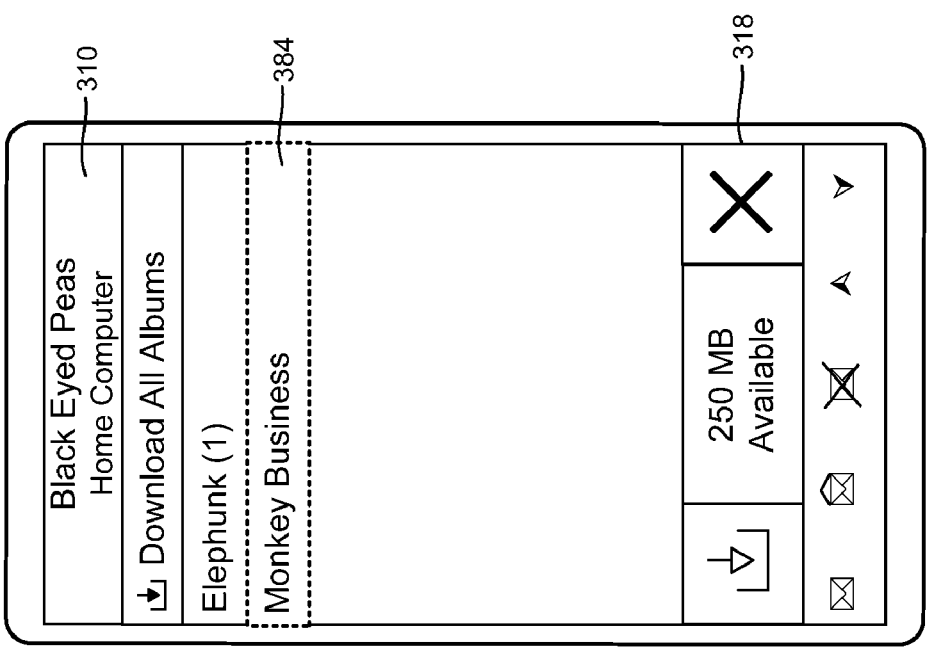
Figure 12E:
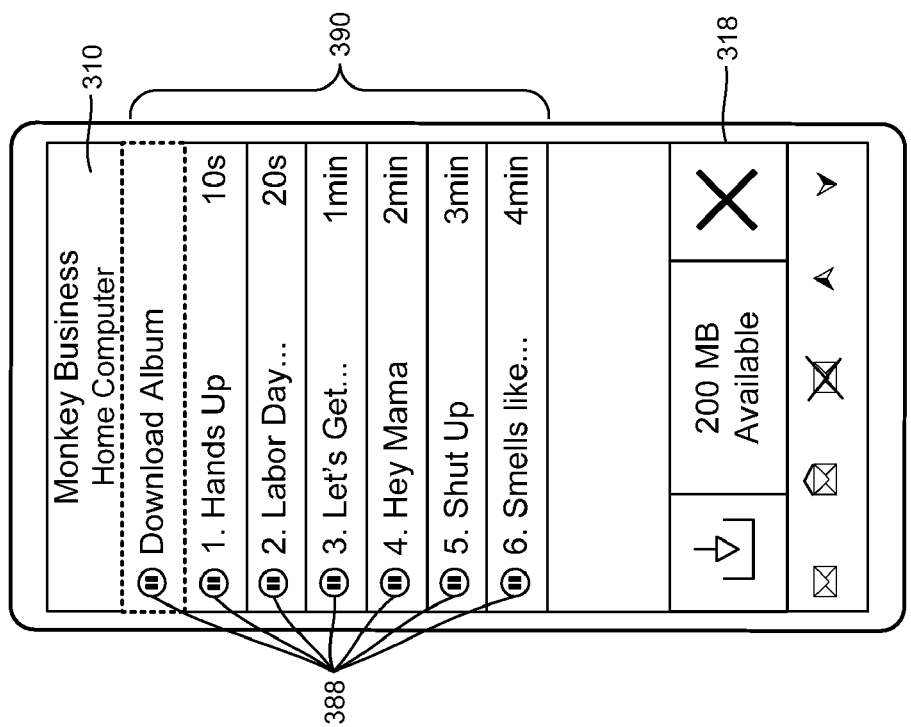

In FIGS. 12a-12d, the screens displayed to a user according to an embodiment when downloading an album are shown. In FIG. 12a, the attribute categories 304 displayed when the media manager application is invoked are shown. The banner 310 indicates that the "Media Sync" application is active, and that the remote computing device to which the portable electronic device is being synchronized is "Home Computer". The bracketed count following each category title indicates how much content in each category is currently resident on both the portable electronic device and the remote computing device. In other words, the bracketed counts indicate how much content is already synchronized between the portable electronic device and the remote computing device. If a user selects "Artists" category 380, all available artists, whether currently downloaded to the portable electronic device or not, will be shown in a new screen rendered on the GUI, as shown in FIG. 12b. The bracketed counts after an artist's name indicate the number of media files currently stored on both the portable electronic device and the remote computing device (i.e. already synchronized between the devices). If the user selects an artist, such as "Black Eyed Peas" 382, the available albums for the selected artist are shown in the album level screen, as shown in FIG. 12c. The sum count after the album titles indicates how many tracks, or media files, from the album are stored both on the portable electronic device and the remote computing device. To view the available tracks from an album, the user selects the album name, such as "Monkey Business" 384, and a list of the available tracks is displayed in a new screen, as shown in FIG. 12d. The available tracks are not yet selected for download, and therefore all have a "Stopped Download" status indicator. By selecting the "Download Album" item 386, the user causes the media manager application to change the status of each track 390 to a "Currently Downloading" status indicator 388, and to start downloading each track when a connection to the remote computing device is next detected, as shown in FIG. 12e.

Figure 13A:
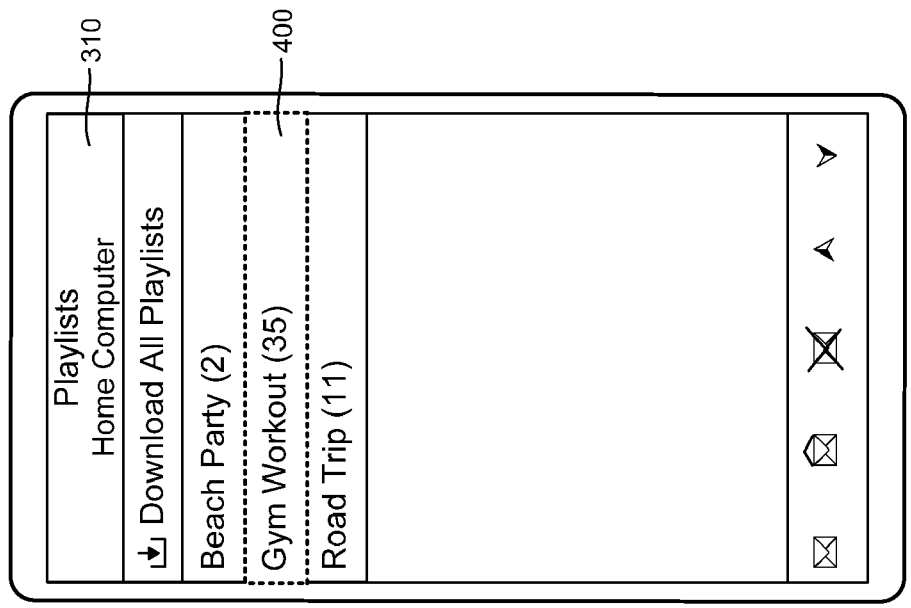
Figure 13C:
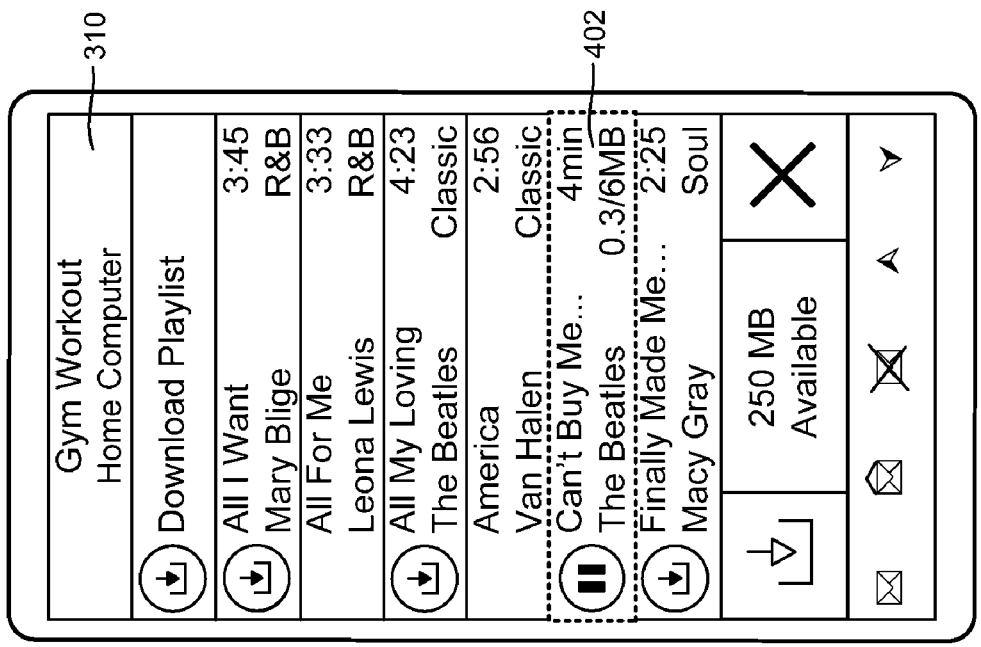
Figure 13B:
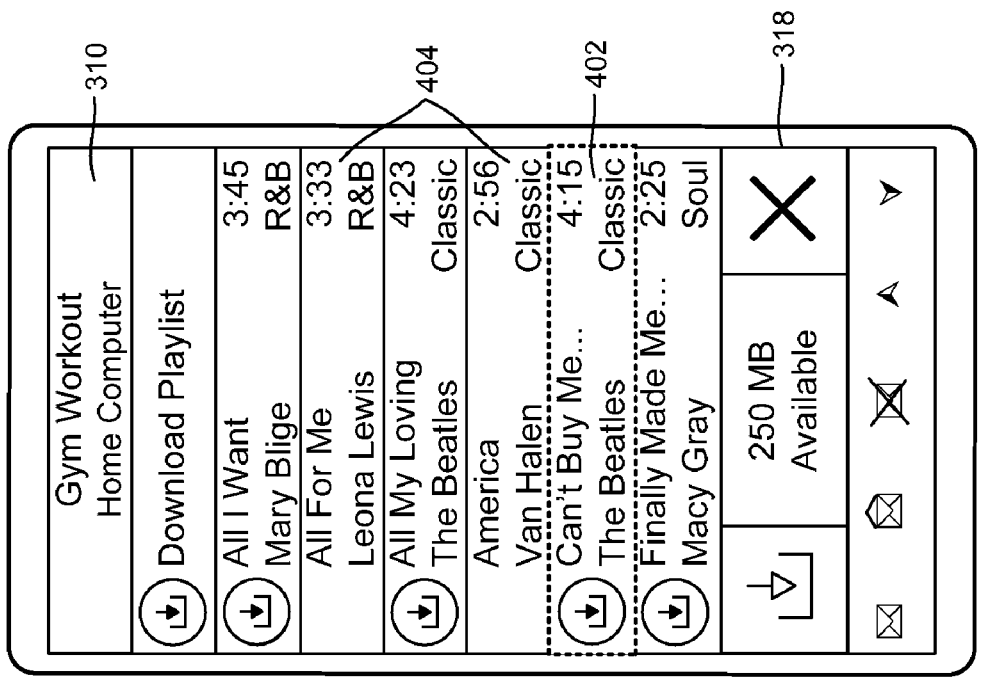

FIGS. 13a-13d further illustrate the ease of navigation when a user wishes to download a particular song or media file. As shown in FIG. 13a, the playlist attribute category has been selected by the user as indicated by the banner 310, and the titles of three available playlists are displayed. The sum count following each playlist indicates the number of media files already synchronized to the portable electronic device from the remote computing device. By selecting one of the playlists, such as "Gym Workout" 400, a song level screen is rendered on the GUI, as shown in FIG. 13b. The song level screen lists all songs on the selected playlist. Those items that include a status indicator, such as item 402, have not yet been downloaded to the portable electronic device. Those items without a status indicator, such as items 404, have already been downloaded and are grayed out. Such grayed out items are not selectable features. If the user selects item 402 for download, its status indicator changes to "Currently Downloading", as shown in FIG. 12c. Once downloading is complete, item 402 is also shown without a status indicator, and is grayed out, as shown in FIG. 12d. The amount of memory available, shown at 406, is also updated to reflect the remaining memory available on the portable electronic device.

Figure 14A:
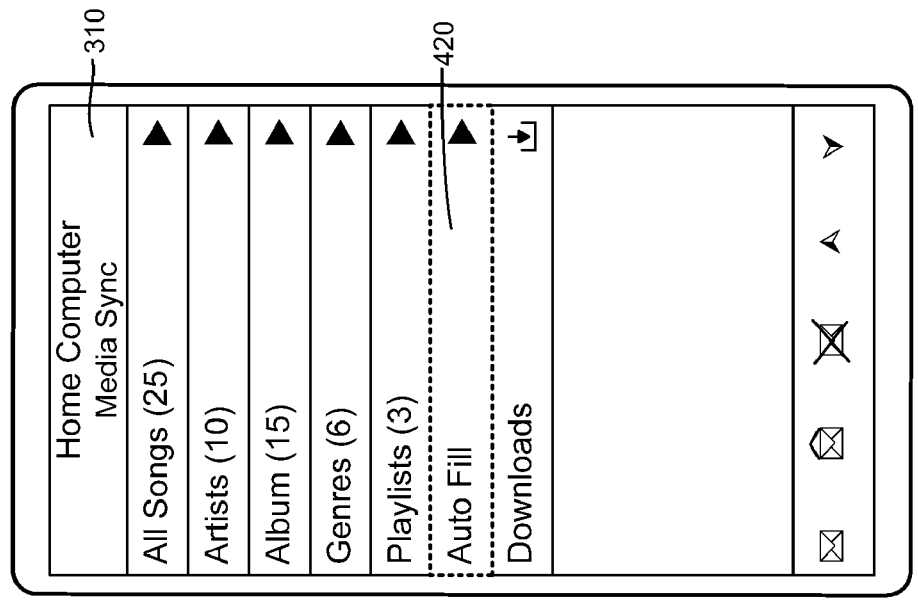
Figure 13D:
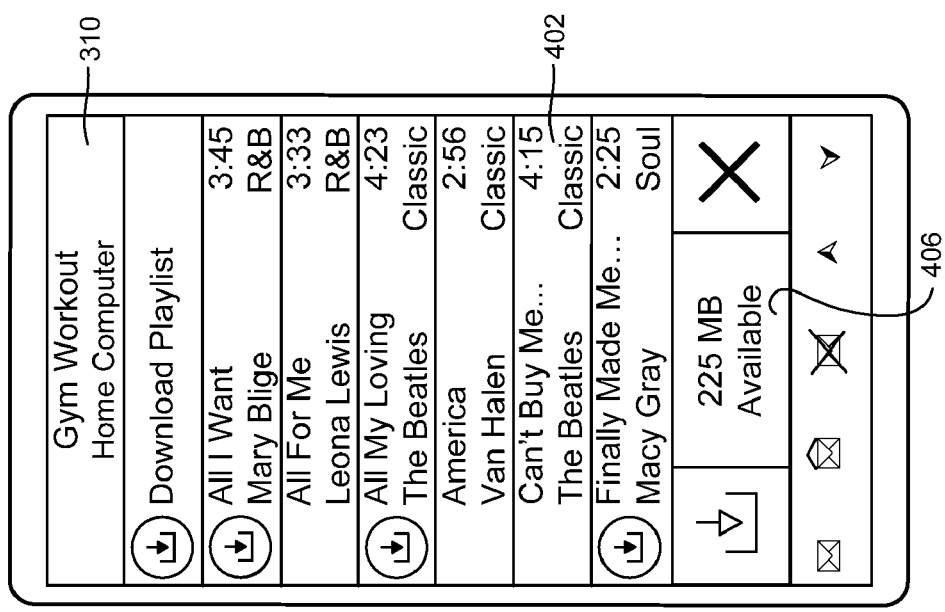
Figure 14C:
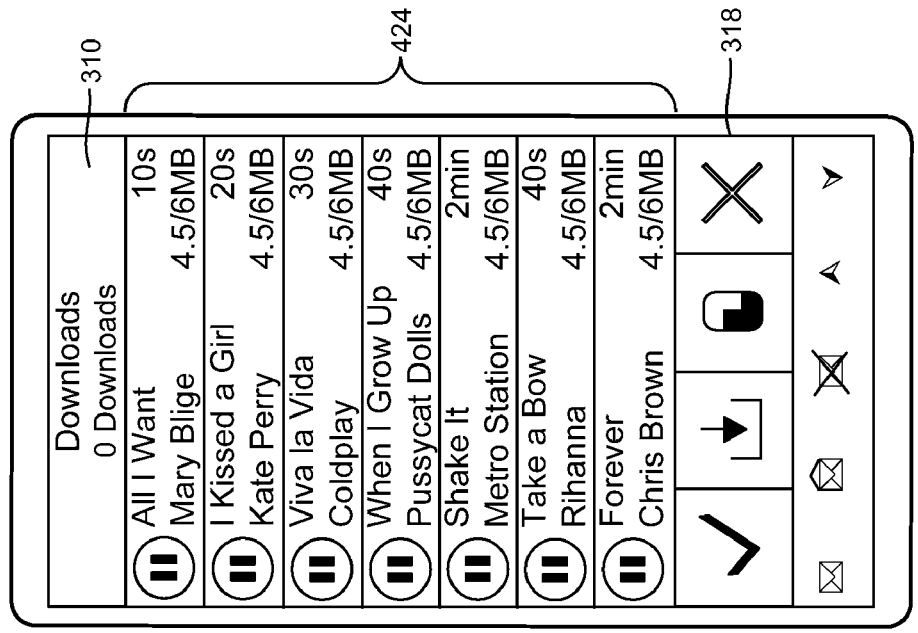
Figure 14B:
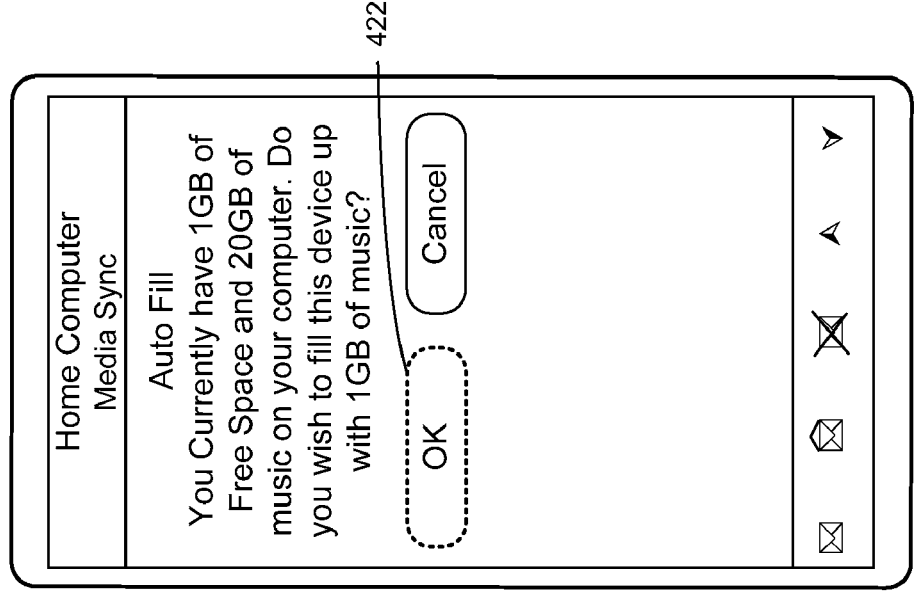

FIGS. 14a-14c show yet another embodiment that provides simplified navigation and ease of use to a user of the media manager application. As shown in FIG. 14a, an "Auto Fill" function 420 is provided within the initial media manager screen. By selecting this function, the user is presented with an "Auto Fill" confirmation window 422, as shown in FIG. 14b. The Auto Fill function determines how much free space is available on the portable electronic device, and selects sufficient media files to fill the available space. If a user selects "OK" within window 422, the media manager application populates the download list 424 with available titles, and sets their status to "Currently Downloading" when a connection to the remote computing device is next detected. This permits a user to load media files to a portable electronic device without the need to select individual files, playlists, etc.

Figure 15B:
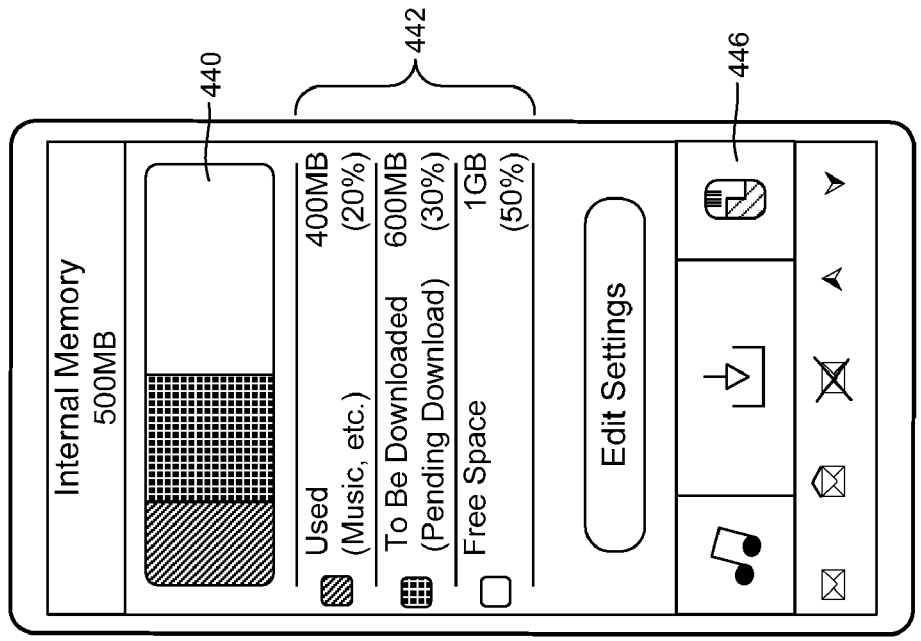
Figure 15A:
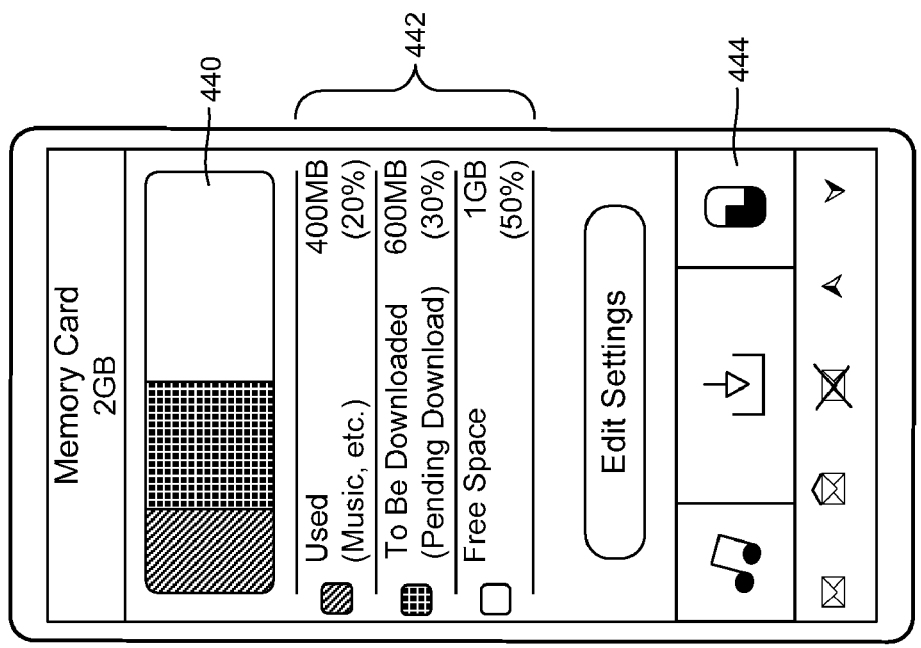

Embodiments of further features that can be implemented in the media manager application are shown in FIGS. 15a-16c. FIGS. 15a and 15b show the screens for a memory function that can be invoked by selecting the "Memory" function icon 324 shown in FIG. 6. The memory function displays current memory usage as a graphic 440 and in a text format 442. FIG. 15a shows the screen for a memory card, while FIG. 15b shows the screen for internal memory, such as memory 30, of the portable electronic device. A user can toggle between the screens by selecting icons 444 and 446, respectively.

Figure 16B:
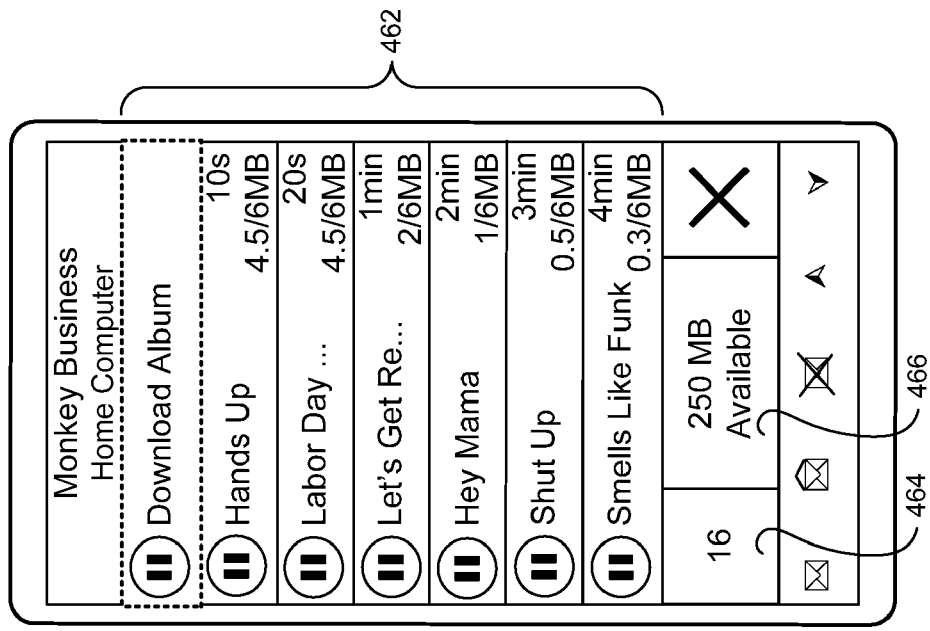
Figure 16A:
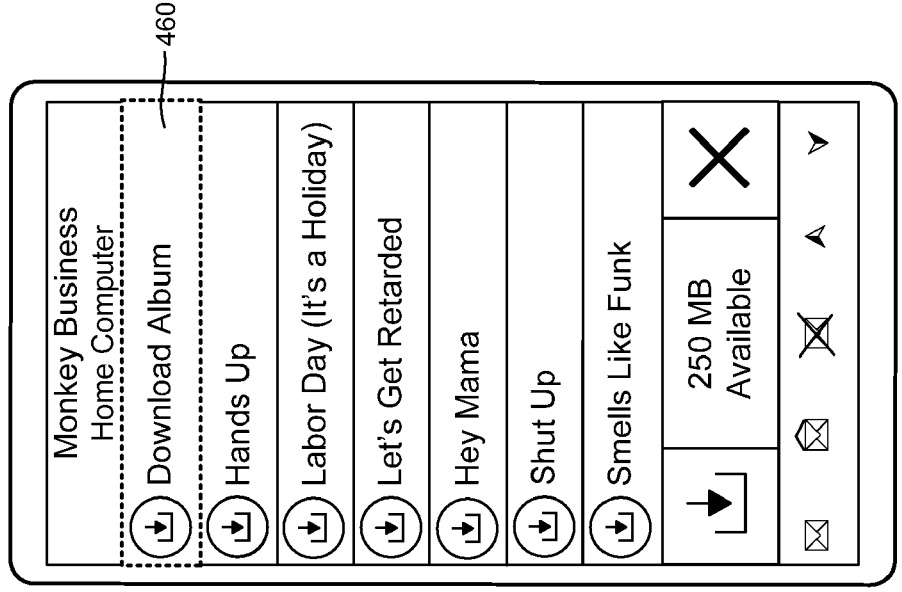
Figure 16C:
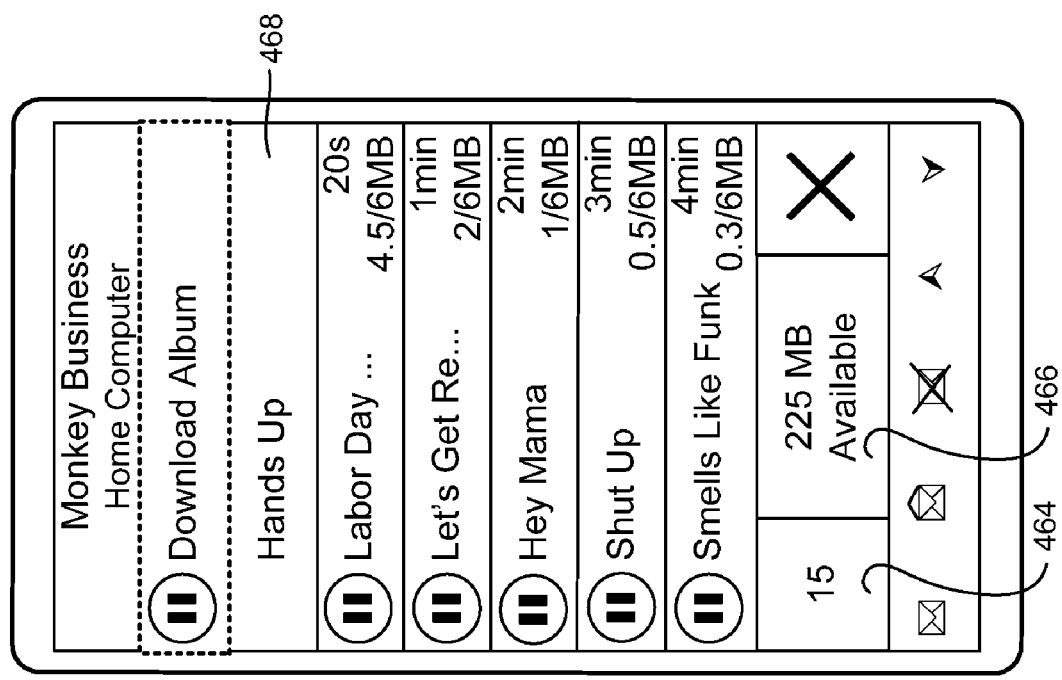

FIGS. 16a-16c show a dynamic count feature that can be implemented to show the remaining number of downloads. In FIG. 16a, a user selects "Download Album" 460, which causes the status of all available tracks 462 on the album to be changed to "Currently Downloading" as shown in FIG. 16b. A download count indicator 464 displays in the lower left hand corner of the screen, and the current amount of available memory is displayed at 466. As shown in FIG. 16c, as the downloading of individual tracks on the album is completed, as indicated by the item at the top of the list, the download count 464 is decremented, and the amount of available memory is updated.

While the embodiments described herein are directed to particular implementations of the portable electronic device and the method of remotely managing media on the portable electronic device, it will be understood that modifications and variations may occur to those skilled in the art. All such modifications and variations are believed to be within the sphere and scope of the present disclosure.

The invention claimed is:

1. A method comprising:
  detecting at least one activation touch event with a touch screen display;
  in response to the at least one activation touch event, displaying a list of media files having shared attributes and identifying at least one media file listed in a media file index for synchronization with a remote computing device; and
  synchronizing the portable electronic device with the remote computing device by at least mirroring a most recent version of data files between the portable electronic device and the remote computing device, wherein the at least one media file is transferred between the portable electronic device and the remote computing device during synchronization of the portable electronic device with the remote computing device.

2. The method of claim 1, wherein the attributes comprise artist, album, genre, playlist, and download status.

3. The method of claim 1, further comprising, in response to a plurality of activation touch events, navigating from an initial screen through a plurality of linked screens associated with selected attribute levels.

4. The method of claim 3, wherein the list of media files having shared attributes is filtered according to the selected attribute levels.

5. The method of claim 1, further comprising detecting a further activation touch event selecting a pause function and pausing downloading of the at least one media file to memory of the portable electronic device.

6. The method of claim 1, further comprising detecting a further activation touch event selecting a delete function and deleting selected media files from memory of the portable electronic device.

7. The method of claim 6, wherein the highlighted media files are selected media files are selected by a highlighting touch event.

8. The method claim 1, further comprising detecting a further touch event selecting a clear function and clearing the at least one media file from a download list.

9. The method of claim 1, further comprising detecting a further touch event selecting a play function and playing the at least one media file through a media player application.

10. The method of claim 1, further comprising updating the composite media index file after synchronization of the portable electronic device with the remote computing device.

11. The method of claim 1, wherein synchronization of the portable electronic device and the remote computing device comprises wireless synchronization over a wireless network connection.

12. The method of claim 1, wherein synchronization of the portable electronic device and the remote computing device comprises direct synchronization over a connection between a data port on the portable electronic device and the remote computing device.

13. The method of claim 1, wherein detecting the at least one activation touch event comprises detecting a touch event made with sufficient force to activate a switch underlying the touch screen display.

14. A portable electronic device comprising:
  a touch screen display; and
  a processor coupled to the touch screen display and configured to detect at least one activation touch event with a touch screen display;
  in response to the at least one activation touch event, display a list of media files having shared attributes and identify at least one media file listed in a media file index for synchronization with a remote computing device; and
  synchronize the portable electronic device with the remote computing device by at least mirroring a most recent version of data files between the portable electronic device and the remote computing device, wherein the at least one media file is transferred between the portable electronic device and the remote computing device during synchronization of the portable electronic device with the remote computing device.

15. The portable electronic device of claim 14, wherein the processor is further configured to detect a further activation touch event selecting a pause function and pause downloading of the at least one media file to memory of the portable electronic device.

16. The portable electronic device of claim 14, wherein the processor is further configured to detect a further activation touch event selecting a delete function and delete selected media files from memory of the portable electronic device.

17. The portable electronic device of claim 14, wherein the processor is further configured to update the composite media index file after synchronization of the portable electronic device with the remote computing device.

18. The portable electronic device of claim 14, wherein synchronization of the portable electronic device and the remote computing device comprises wireless synchronization over a wireless network connection.

19. The portable electronic device of claim 14, wherein synchronization of the portable electronic device and the remote computing device comprises direct synchronization over a connection between a data port on the portable electronic device and the remote computing device.

20. A computer-readable medium having computer-readable code embodied therein for execution by a processor to:
  detect at least one activation touch event with a touch screen display;
  in response to the at least one activation touch event, display a list of media files having shared attributes and identify at least one media file listed in a media file index for synchronization with a remote computing device; and
  synchronize the portable electronic device with the remote computing device by at least mirroring a most recent version of data files between the portable electronic device and the remote computing device, wherein the at least one media file is transferred between the portable electronic device and the remote computing device during synchronization of the portable electronic device with the remote computing device.

* * * * *